United States Patent
Arbuckle et al.

(10) Patent No.: US 12,361,043 B1
(45) Date of Patent: Jul. 15, 2025

(54) SYSTEM AND METHOD FOR REGULATORY INTELLIGENCE EVALUATION, INTERMEDIARY MAPPING AND THRESHOLDING TO GENERATE INSIGHTS, AND ACCELERATING CONFORMANCE THROUGH CONTINUOUS MONITORING

(71) Applicant: Privacy Analytics Inc., Ottawa (CA)

(72) Inventors: Lon Michel Luk Arbuckle, Ottawa (CA); Devyani Priyambada Biswal, Toronto (CA); Muhammad Oneeb Rehman Mian, Ottawa (CA)

(73) Assignee: Privacy Analytics Inc., Ottawa (CA)

( * ) Notice: Subject to any disclaimer, the term of this patent is extended or adjusted under 35 U.S.C. 154(b) by 0 days.

(21) Appl. No.: 19/005,436

(22) Filed: Dec. 30, 2024

Related U.S. Application Data

(60) Provisional application No. 63/685,133, filed on Aug. 20, 2024.

(51) Int. Cl.
*G06F 17/00* (2019.01)
*G06F 16/34* (2019.01)

(52) U.S. Cl.
CPC ................ *G06F 16/345* (2019.01)

(58) Field of Classification Search
CPC .................................................... G06F 16/345
See application file for complete search history.

(56) References Cited

U.S. PATENT DOCUMENTS

| | | | |
|---|---|---|---|
| 8,484,183 B1 * | 7/2013 | Bubeck | G06F 16/3338 |
| | | | 707/706 |
| 10,650,007 B2 * | 5/2020 | Azzam | G06F 16/248 |
| 11,367,008 B2 * | 6/2022 | Rao | G06N 20/00 |
| 11,563,858 B1 * | 1/2023 | Rosen | H04L 67/535 |

(Continued)

FOREIGN PATENT DOCUMENTS

| | | | | |
|---|---|---|---|---|
| WO | WO-2017023521 A1 * | 2/2017 | | G06F 19/3406 |
| WO | WO-2023146754 A1 * | 8/2023 | | G06F 16/93 |

OTHER PUBLICATIONS

Sai, Catherine, et al, "Identification of Regulatory Requirements Relevant to Business Processes: A Comparative Study on Generative AI, Embedding-based Ranking, Crowd and Expert-driven Methods", pp. 1-30, Jan. 2, 2024, 1TUM School of Computation, Information and Technology, Technical Univ of Munich (Year: 2024).*

(Continued)

*Primary Examiner* — Laurie A Ries
(74) *Attorney, Agent, or Firm* — Fish & Richardson P.C.

(57) ABSTRACT

Methods, systems, and apparatus, including computer programs encoded on a computer storage medium, for a system of one or more computers located in one or more locations. The system includes: obtaining input data from one or more regulatory resources; analyzing, using a first set of models, the obtained input data to determine insights related to industry regulations; further analyzing, using a second set of models, overlap between the input data and a control matrix, wherein the control matrix summarizes existing regulations;

(Continued)

based on the overlap, determining a score to represent a degree of the overlap. Based on the degree of the overlap, the system provides summary of recommended next steps.

17 Claims, 26 Drawing Sheets

(56) References Cited

U.S. PATENT DOCUMENTS

| | | | | |
|---|---|---|---|---|
| 11,972,360 | B2* | 4/2024 | Kim | G06F 40/205 |
| 12,001,464 | B1* | 6/2024 | Arkoff | G16H 10/60 |
| 12,111,754 | B1* | 10/2024 | Mysore | G06F 11/3684 |
| 12,135,949 | B1* | 11/2024 | Cameron | G06F 40/40 |
| 2012/0158604 | A1* | 6/2012 | Lawton | G16H 40/20 705/317 |
| 2014/0258312 | A1* | 9/2014 | Hamborg | G06F 16/283 707/736 |
| 2020/0142920 | A1* | 5/2020 | Alexander | G06F 16/487 |
| 2020/0349199 | A1* | 11/2020 | Jayaraman | G06F 40/49 |
| 2020/0401932 | A1* | 12/2020 | Kumar | G06Q 30/0631 |
| 2022/0253871 | A1* | 8/2022 | Miller | G06F 16/36 |
| 2023/0208869 | A1* | 6/2023 | Bisht | G06N 7/01 726/23 |
| 2023/0214754 | A1* | 7/2023 | Eidelman | G06Q 10/06375 705/7.37 |
| 2023/0214949 | A1* | 7/2023 | Eidelman | G06Q 50/18 705/311 |
| 2024/0037565 | A1* | 2/2024 | Siekman | G06Q 30/018 |
| 2024/0112258 | A1* | 4/2024 | Yeung | G06Q 40/06 |
| 2024/0248963 | A1* | 7/2024 | Parham | G06F 18/2415 |
| 2024/0303258 | A1* | 9/2024 | Atluri | G06F 16/288 |
| 2025/0053662 | A1* | 2/2025 | Misra | G06F 21/577 |
| 2025/0054692 | A1* | 2/2025 | Kim | H01G 4/012 |

OTHER PUBLICATIONS

GMInsights.com [online], "AI Governance Market Size," Jul. 2024, retrieved on Feb. 18, 2025, retrieved from URL <https://www.gminsights.com/industry-analysis/ai-governance-market>, 12 pages.

IQVIA.com [online] "IQVIA Regulatory Mapping," Sep. 2024, retrieved on Jan. 3, 2025, retrieved from URL <https://www.iqvia.com/-/media/iqvia/pdfs/library/fact-sheets/iqvia-regulatory-mapping---fact-sheet.pdf>, 2 pages.

IQVIA.com [online], "Drive insights with defensible data & AI," available on or before Nov. 30, 2024, via Internet Archive: Wayback Machine URL <https://web.archive.org/web/20241130232829/https://www.iqvia.com/solutions/real-world-evidence/defensible-data-ai>, retrieved on Mar. 4, 2025, retrieved from URL <https://www.iqvia.com/solutions/real-world-evidence/defensible-data-ai>, 11 pages.

IQVIA.com [online], "IQVIA AI Management," Sep. 2024, retrieved on Jan. 3, 2025, retrieved from URL <https://www.iqvia.com/-/media/iqvia/pdfs/library/fact-sheets/iqvia-ai-management---fact-sheet.pdf>, 2 pages.

IQVIA.com [online], "IQVIA Horizon Scanning," Sep. 2024, retrieved on Jan. 3, 2025, retrieved from URL <https://www.iqvia.com/-/media/iqvia/pdfs/library/fact-sheets/iqvia-horizon-scanning---fact-sheet.pdf>, 2 pages.

Privacy Analytics.com [online], "A Blueprint for Defensible AI," May 27, 2024, retrieved on Mar. 4, 2025, retrieved from URL <https://privacy-analytics.com/resources/articles/a-blueprint-for-defensible-ai/>, 3 pages.

Privacy Analytics.com [online], "An Integrated Approach to Securing AI," Jun. 14, 2024, retrieved on Mar. 4, 2025, retrieved from URL <https://privacy-analytics.com/resources/articles/an-integrated-approach-to-securing-ai/>, 4 pages.

Privacy Analytics.com [online], "Navigating AI by Evaluating Readiness," May 6, 2024, retrieved on Mar. 4, 2025, retrieved from URL <https://privacy-analytics.com/resources/articles/navigating-ai-by-evaluating-readiness/>, 4 pages.

* cited by examiner

SYSTEM AND METHOD FOR REGULATORY INTELLIGENCE EVALUATION, INTERMEDIARY MAPPING AND THRESHOLDING TO GENERATE INSIGHTS, AND ACCELERATING CONFORMANCE THROUGH CONTINUOUS MONITORING

CLAIM OF PRIORITY

This application claims priority to U.S. Patent Application Ser. No. 63/685,133, filed on Aug. 20, 2024, the entire contents of which are hereby incorporated by reference.

TECHNICAL FIELD

The present disclosure relates to monitoring and accelerating conformance to regulations.

BACKGROUND

New requirements, regulations, guidance, and industry standards are often circulated over a variety of databases and resources. News updates, such as updates of critical design failures, often inform industry design decisions for future products. Organizations must adhere to and to keep pace with the continually evolving regulatory and best practice landscape around the responsible use and governance of their products. Because of these requirements, it may be beneficial to identify evolving regulations in a sector or industry.

SUMMARY

As stated above, organizations are challenged to adhere to and to keep pace with the continually evolving regulatory and best practice landscape around the responsible use and governance of their products. The emergence of AI systems has raised many regulatory concerns, as an advent of regulations such as the EU AI Act, NIST AI risk management frameworks, ISO 42001, and other related standards and guidelines make this a complex space for organizations to tackle and maneuver within. In particular, healthcare organizations developing AI applications face complex challenges in navigating the evolving landscape of global regulations, including privacy laws, cybersecurity requirements, clinical trials, pharmacovigilance, and other regulatory frameworks. These complexities can hinder the effective integration of AI technologies into healthcare products and services, making compliance a significant obstacle. Overall, keeping product features compliant and optimizing them for improved usability and outcomes requires staying ahead of regulatory changes.

Horizon scanning is a systematic process for examining information. Horizon scanning can help companies identify potential threats, opportunities, and changes within their sector. Staying up-to-date on new regulations, guidance, standards, and precedent allows companies to determine potential risks to their projects, as well as opportunities. Companies can also identify trends, developments, and potential disruptions to their business. The system described provides organizations with proactive horizon scanning to adapt to regulatory shifts in their sector. As described in further detail below, the horizon scanning system may continuously monitor and analyze emerging regulations and trends. It can proactively identify upcoming changes and align them with a common set of requirements, ensuring that user product implementations remain ahead of compliance updates and industry best practices.

To facilitate horizon scanning, the system may use real-time source harvesting to identify the most current updates on laws, regulations, rulings, interpretations, and opinions. The system may weight sources by their importance to provide the most relevant information. The system may provide advanced insight generation, as it may leverage an AI-driven pipeline to process and match sources to targeted key insights, effectively transforming complex regulatory and legal language into clear engineering requirements and design goals. The system is customizable, as the regulatory mapping may be tailored to each user's specific needs, considering the unique risks, governance requirements, and sensitivities associated within their sector. Finally, the system may provide interactive alerts and updates. The system may alert users using scoring and thresholding methodologies to prioritize updates, and it may display its insights using an interactive dashboard. The dashboard may allow for customization, such as geography-based views. The sophisticated scoring and mapping tools of the system allows users to prioritize actions based on their potential impact, compliance urgency, and business needs.

In some cases, there are many gaps in regulatory knowledge. For example, organizations implementing AI often struggle to ensure that their policies align with the stringent industry standards required for AI safety, privacy, cybersecurity, patient safety and quality control. Navigating these complex requirements and understanding where gaps exist can be challenging, leading to potential risks and missed opportunities to improve AI safety, security, and reliability.

To remedy this issue, the system may further employ a sophisticated gap-analysis designed to scan user AI policies and score them against industry best practices. Users can securely upload their policies and evidence of practices. The system can automatically read these documents, extracting insights, and scoring them against established standards and best practice guardrails. A comprehensive dashboard then summarizes these scores, offering preliminary guidance and identifying areas for improvement. Unlike broader regulatory tools, AI Management focuses exclusively on AI policy alignment, matching client practices against a single, detailed standard with implementation guardrails. The system provides an executive summary dashboard that highlights best practice levels, making it easy for users to understand where attention is needed without delving into overly complex details. Finally, the system may offer specific recommendations based on the scoring, which helps users make informed decisions about how to update their practices to align with the best standards of AI management.

By automating the ingestion of legal documents, regulations, guidance, and decisions, the system maps these elements into a common framework that guides engineering requirements and helps organizations align their products with compliance needs. Overall, the system described may employ an intermediary mapping and thresholding approach, which may simplify, streamline, and reduce effort and expertise requirements of, all-in-one, the monitoring of and compliance to evolving AI regulations and standards. The same can be said of cybersecurity and privacy, health regulations, among other topics.

In one general aspect, the process described is performed by a system of one or more computers located in one or more locations. The process includes: obtaining input data from one or more regulatory resources; analyzing, using a first set of models, the obtained input data to determine insights related to industry regulations; further analyzing, using a second set of models, overlap between the input data and a control matrix, wherein the control matrix summarizes existing regulations; based on the overlap, determining a score to represent a degree of the overlap. Based on the degree of the overlap, the system provides summary of recommended next steps.

Other embodiments of this and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The foregoing and other embodiments can each optionally include one or more of the following features, alone or in combination. For example, one embodiment includes all the following features in combination.

In some implementations, the one or more regulatory resources comprise one or more of: regulatory bodies, industry reports, news articles, and guidance documents.

In some implementations, the first set of models comprise one or more large language models or natural language processing models.

In some implementations, the second set of models comprise one or more large language models or natural language processing models.

In some implementations, the control matrix comprises a two-dimensional matrix structure, wherein each row represents a predefined regulation.

In some implementations, the analysis comprises using a two-dimensional overlap matrix, wherein the overlap matrix identifies the overlap between each regulation in the control matrix and the input data.

In some implementations, the analysis comprises using a predefined threshold to identify a high, medium, or low degree of overlap between each regulation and the input data.

In some implementations, the summary includes one or more alerts, representative of a high, medium, or low significance alert based on the degree of the overlap.

In some implementations, a non-transitory computer readable storage medium storing instructions that, when executed by one or more processors, cause the one or more processors to carry out the operations described above.

In some implementations a system comprising one or more processors is coupled to a memory, and the one or more processors are configured to carry out the operations of any of the operations described above.

The techniques provided in this specification describe a technical improvement to a computer system that utilizes trained machine learning models. Specifically, the techniques provide an improvement in detecting a degree of overlap between input data and one or more regulatory resources (e.g., documents, news articles, regulations, etc.). Also, the system provides an improvement on adaptively monitoring network traffic data. In an example scenario, the system receives input data, which may include one or more internal company regulatory documents. A user may want to determine whether their company regulatory practices align with current regulatory trends. Based on the user's desired query (e.g., regulatory practices in privacy, patient safety), the system may use a machine learning model to monitor computer network traffic and resources to detect one or more sources that align with the query (e.g., news articles, legal documents, regulations). To detect a degree of overlap between the sources and input data, the system uses one or more specially trained agents (which may comprise one or more LLMs) to complete a series of complex tasks. The agents may employ speech recognition, voice recognition, image recognition, or pattern recognition to detect a degree of overlap between input data and regulatory documents. When such a degree of overlap is detected, the evaluation system may employ other agents to analyze the overlap data and provide project-specific recommendations through a user interface.

Here, the agents or machine learning models may be trained using a particular training algorithm. For example, the system may use a gradient descent, which is an iterative optimization algorithm that minimizes differential real-valued functions. The computer system can utilize the trained agents to complete specific tasks in the regulatory evaluation process. For example, some agents may detect query requests for a regulatory evaluation, while other agents may be specifically trained to detect a degree of overlap among the input and detected documents. Furthermore, some agents may be trained to coordinate one or more sub-agents, and agents may be trained to engage in "cross-talk" to validate each other's outputs. Finally, some agents may be trained to analyze and present the overlap results within a user display, and they may provide one or more recommendations to a user based on their project goals. This is important for users seeking quick and accurate results, as manually querying LLMs is costly and time intensive. Automatically moving through the regulatory detection process with one or more agents also makes the computer system more efficient, as it limits repetitive LLM queries. Once the system outputs its overlap analysis, a user can provide feedback on the system's recommendations. This feedback can be used to re-train the one or more agents operating within the system. In a future evaluation, the system can detect that a received query matches to a query that was already processed by the LLM, and can take preventative actions, such as implementing the feedback from the previous search, and returning, to the client device, the improved evaluation based on their preferences. Unlike conventional systems, which require queries for each analysis step, the disclosed system can supervise itself to complete a multi-step analysis. Thus, this system realizes an improvement in LLM utilization by avoiding the multiple-query delay involved in most LLM transactions. This improves network efficiency, reduces computational demands, and reduces the time for a user to receive a response to a query.

As stated above, the system may include a control matrix, wherein the control matrix summarizes existing regulations. Several existing systems and guidance documents can be adapted into an organized control matrix with functions, categories, and subcategories. For example, the FDA's Quality System Regulation (QSR) Framework (21 CFR Part 820) can be organized into a control matrix around quality system requirements for medical devices. Some categories for this control matrix include: Design Control, Production and Process Control, Corrective and Preventive Action, and Document Controls. Subcategories for the (QSR) control matrix framework may detail specific compliance actions.

Good Clinical Practice (GCP) is an example of a framework. The GCP framework categories can include: Clinical Trial Conduct, Documentation, Participant Protection, and Investigational Product Management. Subcategories for the (GCP) control matrix framework may detail requirements for informed consent, monitoring, and reporting.

In some embodiments, QSR and GCP are mapped together into a matrix with "Functions" (e.g., Quality Management, Risk Mitigation) tied to "Categories" (e.g., Risk Management Plans, Data Integrity) and "Subcategories" (e.g., specific actions or controls like CAPA implementation).

In some embodiments, the EMA GxP Guidelines are adapted into a control matrix. The EMA GxP framework covers or includes Good Manufacturing Practices (GMP), Good Laboratory Practices (GLP), Good Pharmacovigilance Practices (GVP), and Good Distribution Practices (GDP). The EMA GxP framework categories include: Data Integrity, Risk-Based Monitoring, and Quality Assurance. The EMA GxP framework subcategories can detail training protocols, validation processes, and inspection readiness.

In some embodiments, the ICH Guidelines (International Council for Harmonisation) is adapted into a control matrix. The ICH framework is structured around pharmaceutical development, quality, safety, and efficacy. The ICH framework categories include: Efficacy (E-series guidelines like E6 on GCP), Quality (Q-series), and Safety (S-series). The ICH framework subcategories detail specific methods for pharmacovigilance, bioequivalence studies, and safety data collection.

In some embodiments, the GxP and ICH guidelines form a hierarchical matrix where industry standards and actions are organized to reflect functional roles, such as maintaining patient safety or ensuring quality control.

In some embodiments, the EUnetHTA Core Model is adapted into a control matrix, wherein the control matrix provides a modular framework for Health Technology Assessment (HTA). The EUnetHTA Core Model/HTA framework categories include: Health Problem and Current Use of Technology, Clinical Effectiveness, Safety, Economic Aspects, and Ethical Analysis. The EUnetHTA Core Model/HTA framework subcategories detail specific data requirements for demonstrating clinical utility, cost-effectiveness analysis, or ethical impact.

In some embodiments, the ISPOR CHEERS Guidelines are adapted into a control matrix. The CHEERS framework categories include: Cost-effectiveness modeling, transparency in economic evaluations, and reporting standards. The CHEERS framework subcategories detail specific elements such as population stratification and scenario analysis.

In some embodiments, EUnetHTA and CHEERS can map to evaluation actions, such as defining population health outcomes or setting data requirements for reimbursement decisions.

In some embodiments, the ISO 13485: Medical Devices-Quality Management Systems are adapted into a control matrix. The ISO 13485 framework categories include: Risk Management, Supplier Controls, and Complaint Handling. ISO 13485 framwork subcategories detail procedures for CAPA, supplier audits, and incident reporting.

In some embodiments, the ISO 14155: Clinical Investigation of Medical Devices is adapted into a control matrix. The ISO 14155 framework categories include: Clinical Trial Design, Ethics, and Data Management. The ISO 14155 framwork subcategories detail site selection criteria, monitoring plans, and statistical considerations.

In some embodiments, one or more ISO standards may be combined to create a control matrix for global compliance in medical device trials or product lifecycle management. This may allow for adaptation across many regulatory applications, as the framwork can be used to track regulatory compliance, quality assurance, risk mitigation, and patient safety, among other topics. ISO standard frameworks (such as ISO 14155 and ISO 13485) can also be combined to track multiple categories, such as: Clinical Trial Management, Post-Market Surveillance, Data Integrity, and Risk Management. Subcategories for ISO standard frameworks may detail specific compliance actions, such as audit trails, patient consent management, and incident reporting protocols. Overall, this approach could standardize actions across jurisdictions, making compliance with global regulations more manageable, especially in contexts like AI/ML integration, clinical trials, and pharmacovigilance.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This disclosure describes a method for analyzing regulatory intelligence through an intermediary mapping and thresholding approach. The system described conducts intermediary mapping through a control matrix, using a framework or standard for a more formalized list of requirements. Additionally, the system can incorporate expert knowledge to inform guardrails and thresholding, which it can use to score new documents and interpret existing regulations. This process ensures a systematic way to provide decision support and strategic suggestions based on a user's sector, project, or organization. In some implementations, the system may leverage an LLM to speed up the analysis and mapping of regulations. The system may have the ability to focus on specific design functions or alerts in future state changes based on a plethora of inputs, ranging from industry frameworks and best-practice standards to legislation/regulations, regulatory guidance or opinions, legal precedents, etc. The systematized approach described allows a user to consolidate all input documents (e.g. regulations, guidelines, precedent, standards documents identified manually or by the system) into an intermediary mapping process that facilitates decision making, and it streamlines the regulatory mapping process by helping users stay up to date on new regulations, expert opinions, and design considerations.

Here, the computer system can analyze a set of regulatory documents by 1) identifying appropriate regulatory documents and extracting relevant information from the documents efficiently and accurately, 2) mapping the information by aligning the extracted regulatory data into standardized frameworks to ensure consistency and comparability across different regulations, and 3) summarizing and translating the mapped regulatory intelligence into strategic decisions for specific applications. Furthermore, the system can map new regulatory data to an existing framework, which informs users of new regulations.

Figure 1:
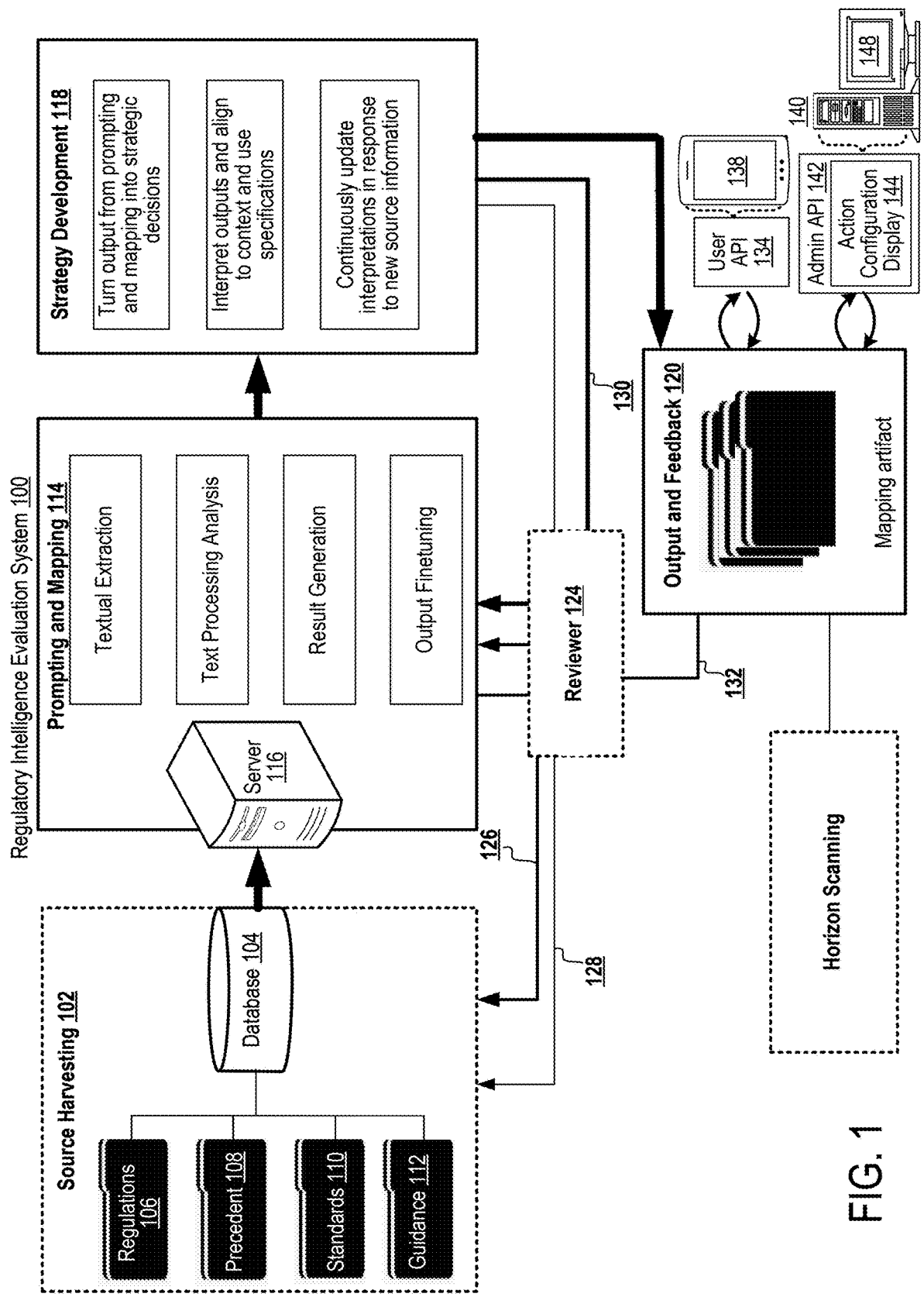
FIG. 1 is a diagram of a system for evaluating regulatory intelligence.

FIG. 1 is a flow diagram of an example system 100 for evaluating regulatory intelligence. For convenience, the system 100 will be described as being performed by a system of one or more computers located in one or more locations. As shown, the system 100 starts with source harvesting 102. The source harvesting step 102 includes a database 104 to store a variety of sources, such as regulations 106, precedent 108, standards 110, and guidance 112 relevant to a user's project, sector, or organization. It should be understood that the database may store other sources, such as regulatory bodies, industry reports, news articles, or videos, among others. The source harvesting 102 may employ a variety of tools to identify such sources and store them in the database 104. Some tools may include web scraping, APIs, or manual collection, where users may upload relevant sources to the database. In some implementations, the source harvesting 102 may employ prompting techniques to instruct one or more models to identify sources on the internet. Furthermore, the search process can be tuned, as an administrator of the system can instruct the system 100 to search for sources on a specific topic. In an example scenario, an administrator of a social media company instructs the evaluation system 100 to search for AI regulations related to targeted advertising, as they expect new regulations to soon emerge in this field. The system 100 will identify multiple regulations 106, precedent 108, standards 110, and guidance 112 (among other resources) on such AI regulations, and the system will store these relevant sources in the database 104.

In a following prompting and mapping step 114, the source information from the database 104 is transmitted to a server 116 for textual extraction, text processing analysis, result generation, and output finetuning. The prompting and mapping step 114 may analyze, using a first set of models, the obtained data to determine insights related to industry regulations, wherein the first set of models process the identified sources from the source harvesting step 102. The first set of models may be referred to as one or more models. This prompting and mapping step 114 can employ one or more models that include content type analysis, image analysis, video analysis, topic analysis, etc. The first set of models may employ one or more natural language processing models, such as text/document classification, sentiment analysis, information retrieval, parts of speech tagging, language detection and machine translation, conversational agents, knowledge graphs and QA systems. The first set of models may also include one or more large language models, such as OpenAI's GPT series (e.g., GPT-4.5, GPT-4-), Google's Gemini and BERT models, Meta's LLAMA family, Anthropic's Claude models, and Mistral AI's models, among others.

As part of the system's contextualization process, HTML may be gathered from the URL of the sources stored in the database 104 and/or server 116. The system may then extract the text from the source page (to exclude menus and footers) and media assets referenced in the body of the URL. This may be done outside of/pre-AI influence and prompting. As shown, the system includes a reviewer 124 to evaluate system outputs at each step in the system 100. The reviewer 124 may be an artificial intelligence model (e.g., one or more LLMs, a machine learning agent, an auditor, or one or more individuals. The reviewer 124 is be in the loop of one or more steps within system 100. In some implementations, the prompting and mapping step 114 may instruct one or more model(s) to summarize the contents of the sources. The prompting and mapping step 114 may employ one or more model(s) to summarize the information in a report-style summary, where they summarize or list key findings with a text summary. The prompting and mapping step 114 may instruct the model(s) to identify key regulatory information in the documents and record the location of the information in the documents, which may streamline the reviewing process for reviewer 124. The models may be instructed to compile a report, which may include a variety of graphs, tables, alerts, frameworks etc. to summarize the system findings. In some implementations, the prompting and mapping step 114 may extract and sort each regulation 106, precedent 108, standard 110, and guidance 112 (or another identified source) into a control matrix or regulatory framework, wherein each row of the matrix or framework summarizes a key regulation 106, precedent 108, standard 110, or guidance 112. The control matrix and regulatory frameworks are described in further detail in FIG. 6.

In some embodiments, reviewer 124 may evaluate the summary or outputs of the the prompting and mapping step 114, and they may be instructed to compare the summary and/or outputs of the prompting and mapping step 114 to the sources identified in the source harvesting step 102. This feedback process is depicted with arrow 126. To facilitate this review process, the prompting and mapping step 114 may prompt one or more models, or it may employ other techniques to highlight the key regulatory information in the sources (106)(108) (110)(112) and/or record the location of key regulatory information in the documents for the reviewer 124 to identify. The prompting and mapping step 114 may also remove unnecessary information, such as menus and footers from the sources to streamline the review process for the reviewer 124. If the reviewer 124 determines that the summary is inaccurate, or that the sources identified are inadequate, they may edit the prompts or instructions of the prompting and mapping step 114 and/or source harvesting step 102 so the system 100 may identify different sources, and/or so it may re-summarize the results.

Once the output of the prompting and mapping step 114 is finetuned (either from the reviewer 124 or from the one or more models) the system 100 employs a strategy development step 118. Based on the output summary of the one or more regulation(s) 106, precedent(s) 108, standard(s) 110, or guidance source(s) 112 identified and mapped in steps 102 and 114, the system transforms the output into strategic guidance decisions based on an administrator's requirements and business objectives. Following the same example of AI targeted advertising regulations described above, the user may like to know the best strategy for expanding their social media platform into another country. If the user employs a high amount of targeted advertising in their platform, they may ask the evaluation system 100 to identify (1) current regulations 106 around targeted advertising through the use of AI in the country they are expanding to, (2) precedent 108 for how similar platforms expanded to this country in the past, (3) standards 110 expected by the country for such platforms, and (4) guidance 112 from legal professionals or companies who have experience on facilitating such an expansion. In the prompting and mapping step 114, the system 100 extracts and summarize all relevant information from the sources harvested. The system 100 may also map each identified regulation 106, precedent 108, standard 110, or guidance 112 to a regulatory framework or a control matrix for further analysis. At this point, the user may act as the reviewer 124 and check the identified sources in the feedback loop 126. They may like to confirm that the sources are trustworthy, and that the prompting and mapping step 114 accurately summarized the information from the sources. In other implementations, one or more models can complete this reviewer 124 step. If the summary is accurate, the user may continue with the strategy development process 118. Based on the control matrix, regulatory framework, or summary output from the prompting and mapping step 114, the system may determine the best next steps for this user's goal of expanding their platform into the new country.

For example, if the desired country for expansion bans the use of AI for targeted ads, the system 100 may suggest that the user removes this aspect of their platform when releasing it in the country. If the guidance 112 or regulations 106 indicate that this ban may be lifted in a year, the system might advise the user to wait a year before launching their platform in the country. After receiving the suggested strategy output from the strategy development step 118, the reviewer 124 may verify that the suggested strategy is consistent with the summary from the prompting and mapping step 114. This feedback process is represented by the arrow 130. If the reviewer 124 is not satisfied with the suggested strategy, they can edit prompts or provide new instructions to the prompting and mapping step 114 to generate a new strategy output. Once the reviewer 124 is satisfied with the strategy output, the system combines one or more of the output(s), summary, feedback, and suggested strategies from the source harvesting 102, prompting and mapping 114, and strategy development 118 into output and feedback 120. The output and feedback may be stored in the database 104, or it may be stored in an alternative database. The output and feedback 120 may be saved as a mapping artifact, which may enable the system 100 to update the output and feedback 120 in the future. The output and feedback 120 may further include a regulatory framework to summarize regulatory intelligence at the time of a first search, and it may also store control matrices, reports, and key regulatory intelligence from subsequent searches. In some implementations, key information from the regulations 106, precedent 108, standards 110, and guidance 112 may be stored in the control matrix (m,n), which maps, segments, and organizes the key information. In some embodiments, the control matrix may be used as the mapping artifact, wherein the control matrix can be stored in the database 104 for a period of time and updated if new regulations emerge.

Once the output and feedback 120 is organized, it is uploaded to a user application programming interface (API) 134, wherein the API is be integrated in a first user device 138. Alternatively, the output and feedback 120 may be directly sent to the first user device 138 via email, SMS, or through alternative methods. The first user device 138 may be tablet, phone, computer, or another device. The output and feedback 120 may also be sent over the internet to a second user device (e.g., an administrative user of the system) 148 for presentation and evaluation. The output and feedback 120 is displayed, through one or more computational device(s) 140 (e.g., a server, computer, or other device), using an admin API 142 or an action configuration display 144 on the second user device 148. The second user device 148 may be tablet, phone, computer, or another device. Alternatively, the output and feedback 120 may be directly sent to the second user device 148 via email, SMS, or through alternative methods. The action configuration display is described in further detail in FIG. 8.

Overall, the methods described for system 100 display the system's capability for horizon scanning, as the system can harvest resources related to a specified topic, summarize and map the resources through prompting of one or more models, and provide a strategy to move forward based on the system's summary and analysis of existing and/or new regulations 106, precedent 108, standards 110, and guidance 112. The system can regularly update its output and feedback 120 and its mapping artifact(s) in response to new regulations 106. Also, the system may be configured to warn users of new guidance 112 or standards 110 that may affect the user's business practices or goals. The system streamlines the transmission of information, as it can easily display its output and feedback on a user API 134 or and admin API 142, or it can simply transmit information to the first user device 138 and/or the second user device 148. The user API 134 may be the same as the admin API 142, or they may be different. The first user of the user API 138 may be the same user as the second user of the admin API 142, or they may be different.

Figure 2:
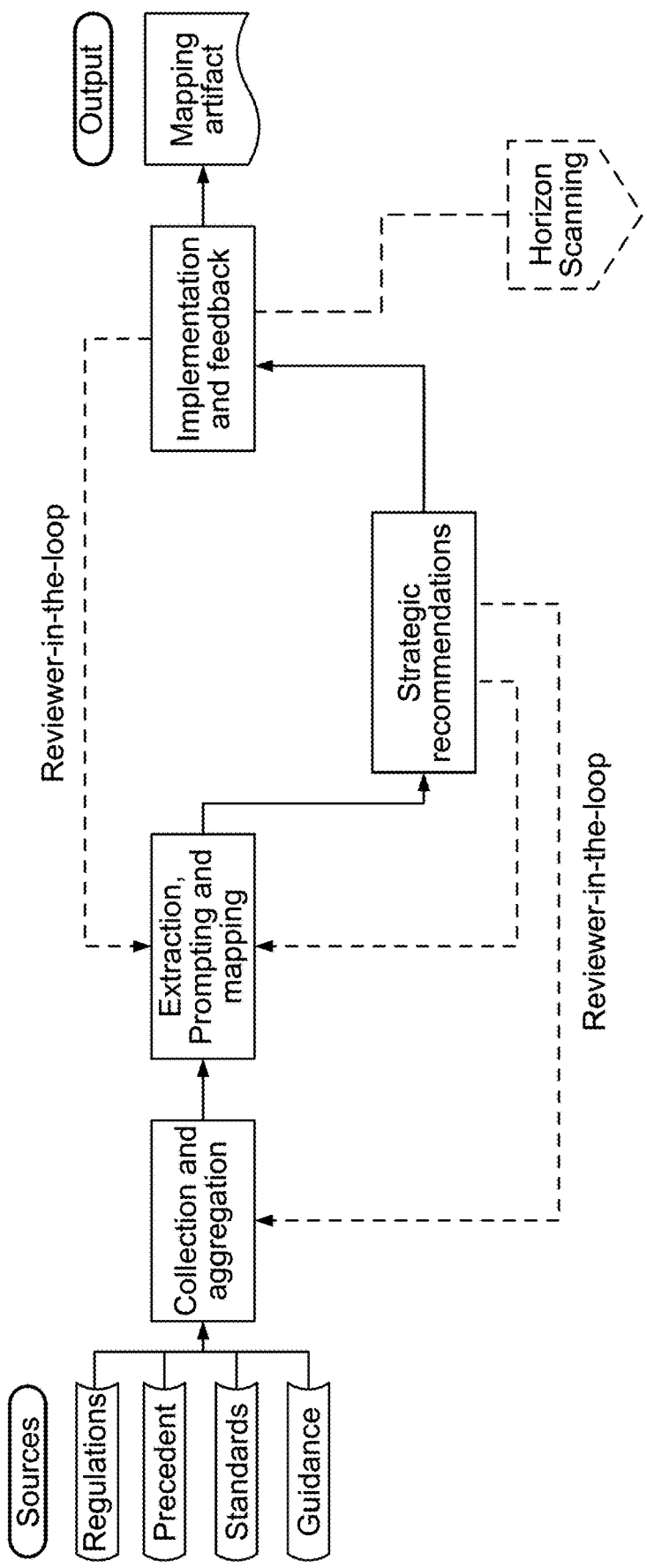
FIG. 2 is a flow diagram of processes for evaluating regulatory intelligence.

FIG. 2 provides a flow diagram of the regulatory intelligence evaluation system process 200. As shown, the system process 200 identifies one or more sources through a collection and aggregation process, wherein the sources are a set of regulatory documents relevant to the system user's project and sector. The system process 200 collects and aggregates these sources, and it employs an extraction step to read and preprocess the content of the one or more sources. The system 200 may prompt a first set of one or more models (e.g., an LLM, NLP, etc.) to identify and extract relevant information from the sources efficiently and accurately. For example, the system may instruct the one or more models to identify and extract key regulatory statements and clauses. The output of the extraction step may include a structured dataset of extracted regulatory elements, ready for further analysis.

In the following prompting and mapping step, the system process 200 aims to align the extracted regulatory data and information into standardized frameworks to ensure consistency and comparability across different regulations. In a first search using the regulatory intelligence evaluation system 200, a user may instruct the system to compile the identified regulatory intelligence into a regulatory framework, which may summarize the known regulations, precedent, standards, and/or guidance at the time of the first search. To complete this step, the system may instruct one or more models to provide a summary of the extracted information from the collection and aggregation step, wherein the summary may include a text summary, graphs, tables, alerts, or a regulatory matrix. In a subsequent search to identify new regulatory intelligence a time period after the first search is completed, the system 200 may repeat the collection and aggregation, extraction, and prompting and mapping step. In the subsequent search, the system may identify new sources and it may instruct one or more models to develop a control matrix to organize the extracted key information from the new documents. The system 200 may instruct a second set of one or more models to identify the overlap between the control matrix and the regulatory framework. The system 200 may instruct the models to highlight overlaps between the regulatory framework and the updated control matrix, which may identify which regulations are upheld from the first search. The system 200 may also instruct the models to highlight gaps between the regulatory framework and the updated control matrix, which may identify new regulations. The models may be instructed to interpret the degree of overlap. For example, the models might conclude that a high degree of overlap signifies that most regulations have not changed since the previous search, while a low degree of overlap may signify that there are new regulations.

Overall, the prompting and mapping step outputs an artifact that explains how each regulation fits into the framework, while highlighting overlaps and gaps. In an example scenario, a user instructed the system 200 to identify regulations for AI targeted advertising a year ago, and the system 200 has a regulatory framework artifact summarizing the standard regulations from this search. The user decides that they would like to conduct another search on the same topic this year, and the system 200 searches for new and/or existing regulatory documents on the topic to develop a new control matrix. If the regulations have not changed significantly since the previous year, the system may identify a high amount of overlap between the old regulatory framework and the new control matrix. If many new regulations are in place, the system 200 may flag or alert the user that the system identified gaps between the previous regulatory framework and the current control matrix (low overlap). If the system identifies many gaps, it might send the user of the system 200 a high priority alert, alerting the user that many regulation changes may impact their sector or project. Similarly, the system may send a medium priority alert or a low priority alert if there are smaller gaps detected between the regulatory framework and the control matrices. The user may manually ask the system 200 to conduct a search, or the user may instruct the system 200 to conduct regular searching (e.g., every month, year, etc.). The system 200 may also be instructed to explain how each identified regulation or key piece of information fits into the framework, and it may be asked to explain or highlight overlaps and gaps.

A reviewer is in the loop (e.g., an AI system, auditor, one or more individuals), and they may analyze the context and implications of each identified element from the extraction framework. The reviewer may determine if the identified sources are trustworthy, and whether the extracted information from the sources is accurate. Additionally, the reviewer may analyze whether the summary from the prompting and mapping accurately reflects the identified information in the sources. If the reviewer does not approve of the summary and/or sources, they may edit the prompts of the one or more models in the system 200, or they may instruct the system 200 to identify alternative sources. If the reviewer approves the summary, the system 200 may move the summary to the strategic recommendations step.

In the strategic recommendations step, the system 200 is instructed to translate the mapped regulatory intelligence and summary into strategic decisions for specific applications. For example, the system might warn users that many regulations were added within a sector, or the system may inform users that there is limited guidance and regulation within another sector. The strategic recommendations step may conduct a scenario analysis, wherein the system 200 may be instructed to apply the mapped data to specific scenarios and use cases. The strategic recommendations step may use strategic decision making by using insights from the scenario analysis to inform design choices tailored to each use case. Overall, the strategic recommendations step aims to produce strategic reports and recommendations for each application area with artifacts to back up decision making so it can provide targeted updates to users based on its insights.

Figure 3:
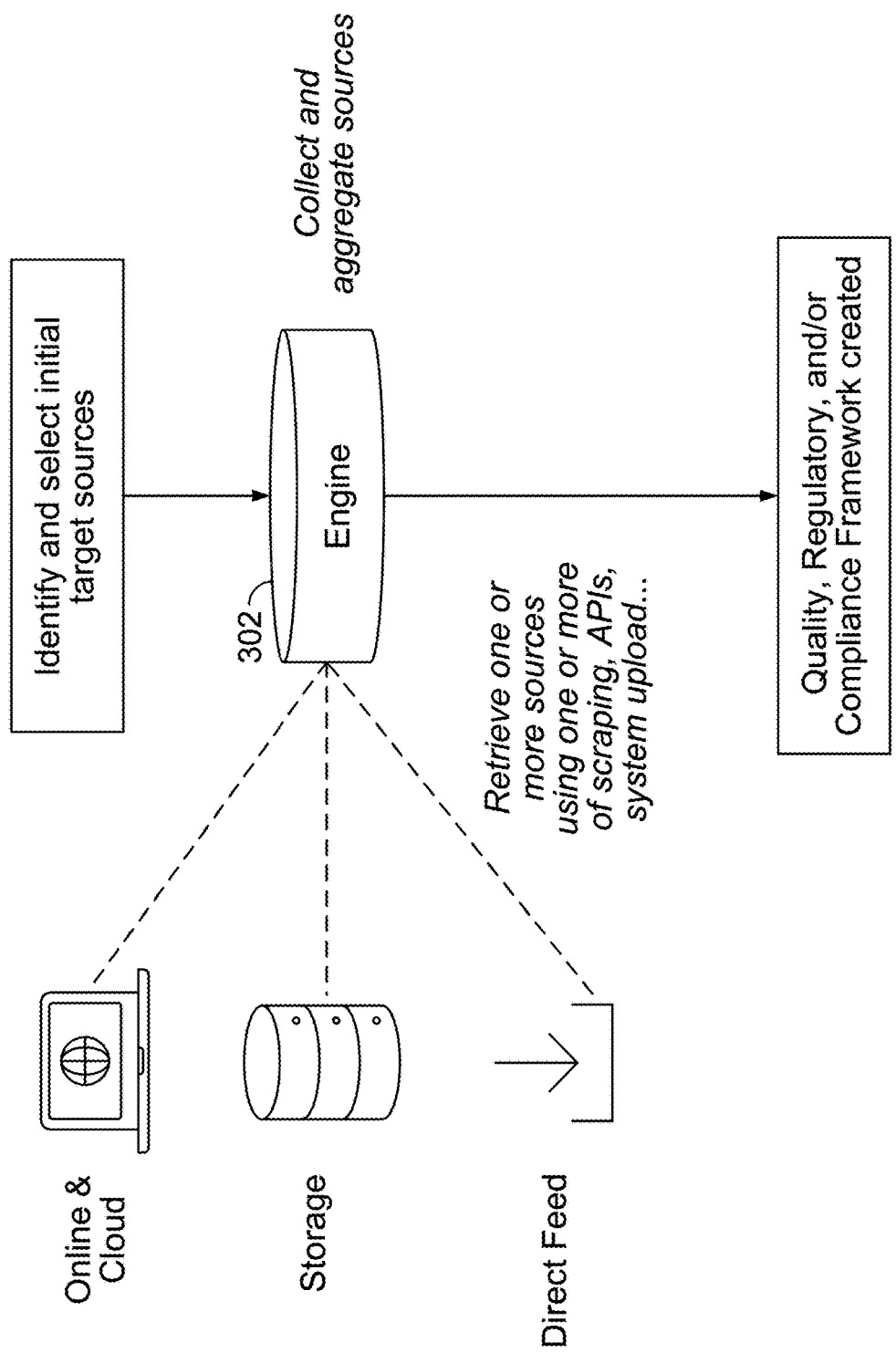
FIG. 3 is a diagram of a collection and aggregation process.

FIG. 3 describes the collection and aggregation process 300 for horizon scanning in more detail. The process 300 may occur one or more times within the regulatory intelligence evaluation system 100. The process 300 may be used to develop one or more regulatory, compliance, quality, or control frameworks, wherein these frameworks summarize the current regulatory standards related to a sector, topic, or project into an organized framework. In some embodiments, the regulatory framework is a two-dimensional matrix. In some implementations, a user may like to conduct a first search of regulations in a sector. Some sectors, such as privacy and security already have clearly defined frameworks. If an existing regulatory is well defined and organized, a user will upload the regulatory framework directly to an engine 302. If a desired search topic has little to no regulatory guidance, a user may manually develop a regulatory framework based on expert opinions or the limited existing guidance, and they will upload this framework to engine 302. In cases where regulatory guidance includes multiple regulatory, guidance, precedent, or standard documents, a user may prefer to use the regulatory intelligence evaluation system 100 to summarize the documents into a regulatory framework. As depicted, an engine 302, such as a device, ruleset system, processor(s) etc. can retrieve relevant sources using one of more techniques of scraping, APIs, system uploads, etc. The engine 302 can retrieve these sources online, through a direct feed, or through storage of previous sources. In an example scenario where a user may like to conduct horizon scanning for regulatory shifts in privacy, cybersecurity, AI, patient safety or quality control, the system may harvest real time updates on privacy and AI laws, cybersecurity sources, FTC, FDA, or EMA rulings. In the first search, the engine 302 collects and aggregates the most current sources into one or more quality, regulatory, and/or compliance frameworks. In some implementations, each row of the regulatory framework(s) corresponds to an identified key regulation from the one or more sources.

In an example scenario, a user would like to conduct a second search a set time period after the regulatory framework is created or manually updated to the engine 302. For example, if a user conducted a search on AI regulations a year ago, they may like to conduct a more current search to determine which regulations (if any) changed in the past year. For a second search, the collection and aggregation process 300 may be repeated, and the process 300 may identify an updated set of regulation, precedent, standard, and/or guidance documents. Using the URL extraction methods described above and/or other methods, the collection and aggregation process may identify key regulatory information in the one or more sources. Once this information is identified, the regulatory intelligence system 100 may map each regulation from the regulatory framework to a location in the one or more updated sources. For each source, the system 100 may determine if the regulation from the regulation framework is still present in current sources, and how much overlap there is between the regulations from the regulatory framework and the current regulatory information in the sources. This process is described in more detail in the following figures.

Figure 4:
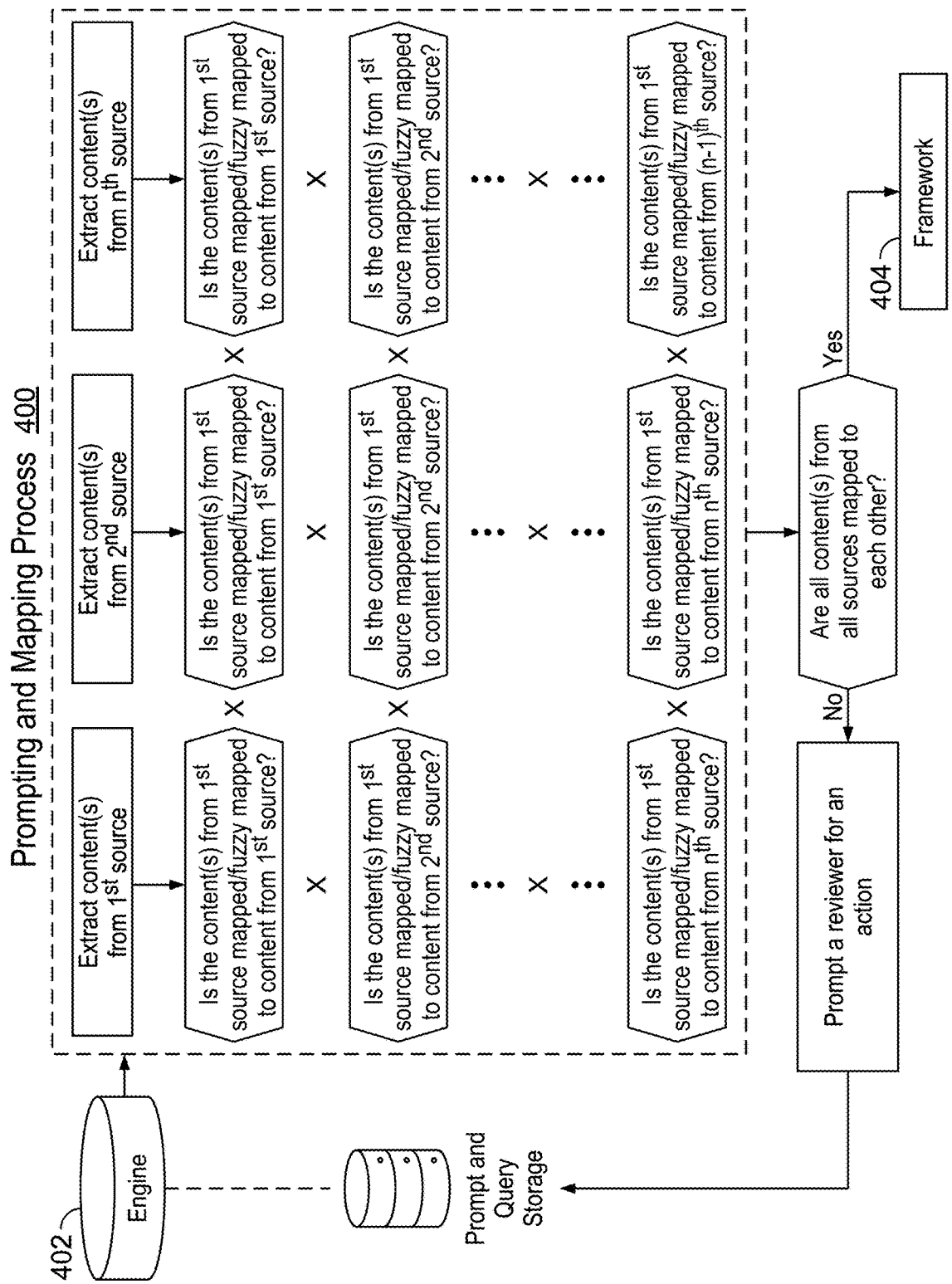
FIG. 4 is a diagram of a prompting and mapping process.

FIG. 4 describes the prompting and mapping process 400 in more detail. The process 400 may occur one or more times within the regulatory intelligence evaluation system 100. As depicted, an engine 402, such as a device, ruleset system, or one or more processors extracts content from the one or more sources identified in the collection and aggregation process 300. The engine 402 may be the same engine as engine 302, or they may be different engines. As described above, the system may extract key regulatory information from the sources and aggregate it into a framework 404, which may include a regulatory framework for a first search, or a control matrix for a subsequent search. Before compiling identified regulatory intelligence from the sources into a framework 404, the prompting and mapping process 400 may compare all the sources to each other to determine if the contents from the sources map to each other. The prompting and mapping process 400 may also determine if the contents approximately map to each other through a fuzzy content search.

To compare source content, the prompting and mapping process 400 may instruct one or more models (e.g., LLMs, NLP, AI models, etc.) to compare the identified content from a first source (e.g. identified keywords, concepts, and phrases, key regulatory information) to the identified content of a second source. The prompting and mapping process 400 may compare source content directly or indirectly. In a direct comparison, the prompting and mapping process 400 may instruct one or more models to determine if the exact concepts or content identified within a first source are also identified within a second source. In an indirect comparison, or with a "fuzzy search" comparison, the prompting and mapping process 400 may instruct one or more models to search for words or phrases of the content in a second source matching the meaning of the identified content in a first source. The words or phrases from the fuzzy search in the second source do not necessarily share the same wording as the identified keywords, phrases, or concepts from the first source. Once the content(s) from the one or more sources are compared to the content(s) of the other sources, the one or more models may be instructed to determine whether the content from all sources mapped to each other. For example, the system may determine whether all the sources mention a specific regulation, or they may determine whether all the source content is consistent around a specific regulation. The models may be instructed to determine an overlap score for each content comparison between a first source and a second source, wherein the score is indicative of a "mapping" or overlap between contents of the sources. The models may provide an overlap score for each extracted key regulatory topic identified across the sources, or the models may provide an overall overlap score to identify how closely all the sources relate to one another, and whether the content is consistent across the sources.

While two sources (a first and a second source) were described above for content mapping, it should be understood that the prompting and mapping process 400 may compare all identified sources from the collection and aggregation process to each other. After comparing the content among the sources, the one or more models may be instructed to determine whether the content(s) from all the sources are sufficiently mapped to one another. The models may use the thresholding score to make this determination. If the source content(s) are not sufficiently mapped to one another, the models may be instructed to prompt a reviewer (e.g. one or more models, an auditor, one or more individuals, an expert, an analyst etc.) for an action. The reviewer may be prompted to select another source, update prompts and queries in the prompting and mapping process 400, among other actions. If the one or more models determine that the contents are sufficiently mapped to one another, the models may compile the framework 404, which may be a quality, regulatory, or compliance matrix. The framework 404 may be two dimensional, and it may organize, map, and compile each piece of regulatory intelligence into the matrix. In some implementations, each row of the matrix may summarize a different law, guidance, or regulation.

Furthermore, while the prompting and mapping process 400 may compare the sources from a single search to each other, it should also be understood that the prompting and mapping process 400 may compare sources from one search to sources of another search. In an example scenario, a system user would like to conduct a search on privacy laws in the healthcare sector, and they ask the regulatory intelligence evaluation system 100 to conduct this search. The regulatory intelligence system conducts the collection and aggregation process 300 to collect relevant guidance, regulatory documents, precedent, standards, among other documents to describe the current status of privacy laws in the healthcare sector. The prompting and mapping process 400 may compare the content among the sources to ensure that the content from the sources map to one another before developing a regulatory framework 404, which aggregates the regulatory intelligence extracted from the one or more sources identified in the collection and aggregation process 300. The regulatory framework 404 may be stored in a database to compare to future searches. In the example scenario, the system users would like to conduct the same search for privacy laws in the healthcare sector a year later. The interaction evaluation system 100 repeats the process above and develops a new control matrix 404 based on the most current regulations and guidelines. In some implementations, the interaction evaluation system 100 instructs one or more models to compare the control matrix 404 to the regulatory framework 404 using the comparison, mapping, and thresholding methods for the prompting and mapping process described above.

As stated above, the system may determine the overlap score by identifying which percentage of template keywords, phrases, or concepts, or regulatory information from a first input source directly or indirectly overlap with the content in the one or more other identified input sources. Alternatively, the system may determine the overlap score by identifying which percentage of template keywords, phrases, or concepts, or regulatory information from a first regulatory framework directly or indirectly overlap with the content in the one or more other identified input sources and/or the content of an updated control matrix. The extracted body text and media assets from the one or more input documents may be used as inputs alongside the parameters to help generate the applicable overlap scores.

Figure 5:
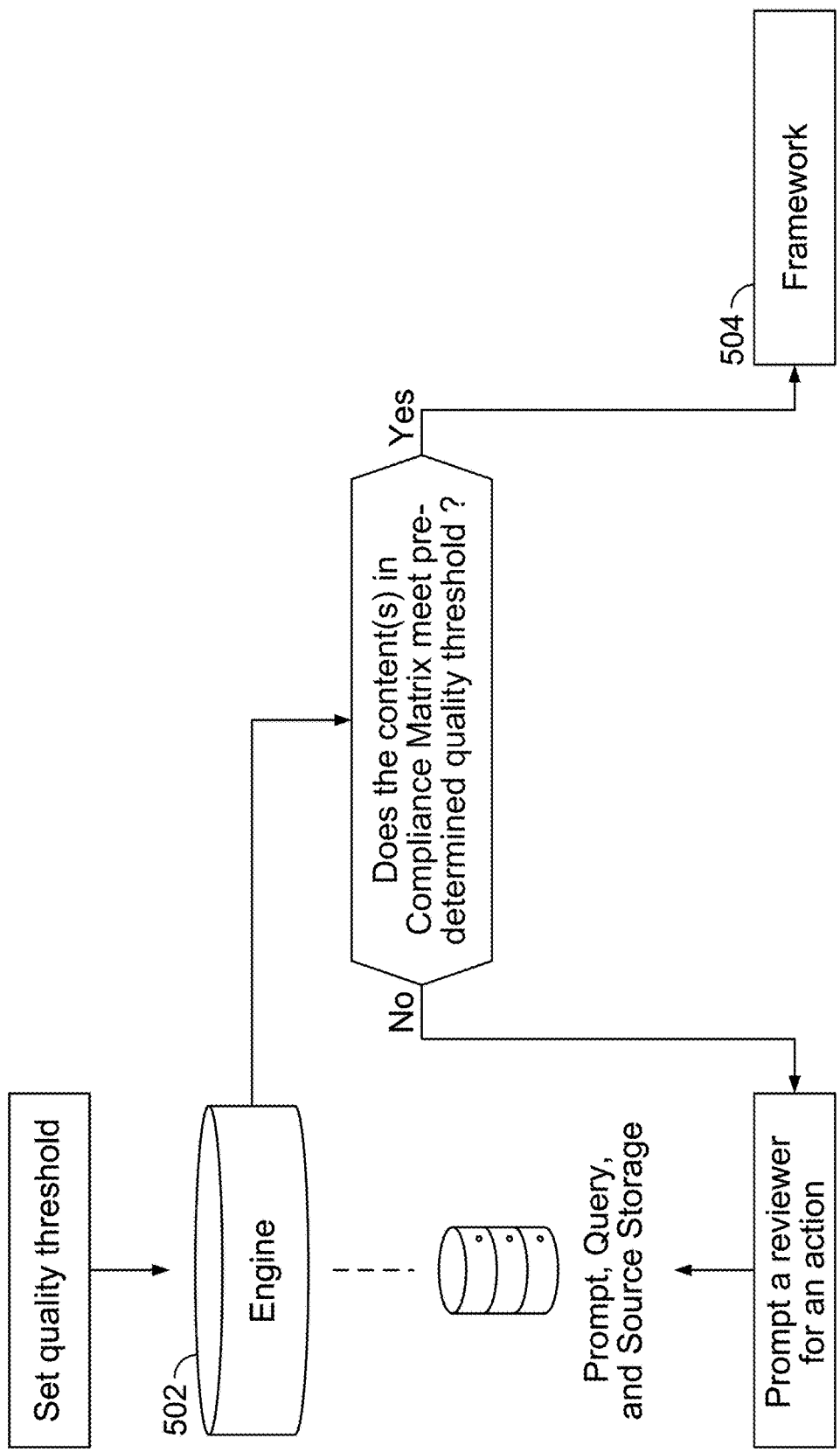
FIG. 5 is a diagram of a thresholding process.

FIG. 5 highlights a thresholding process 500, wherein the prompting and mapping process 400 and/or the overall regulatory intelligence evaluation system 100 employs additional thresholding techniques to determine if content from a first input source sufficiently maps to the content from a second source. The process 500 may occur one or more times within the regulatory intelligence evaluation system 100. As depicted, a user may send a quality threshold to an engine 502, such as a device, ruleset system, or one or more processors to evaluate content from the one or more input sources identified in the collection and aggregation process 300. The engine 502 may be the same engine as engines 302 or 402, or they may be different engines.

In an example scenario, a system administrator sets an overlap score threshold of 50% in engine 502. The overlap threshold may be set based on requirements, constraints, guardrails, or expert opinions. A first input source may be compared to a second input source using this overlap score threshold requirement. If the first source includes less than half of the keywords, key concepts, regulatory information, or phrases when compared to a second source, the models may determine that the overlap score between the first and the second content is less than 50%, which does not meet the threshold. The thresholding process 500 may determine that the content of the first source does not sufficiently map to the content of the second source. In response to the sources failing to meet the quality threshold, one or more models in the thresholding process may be instructed to prompt a reviewer (e.g. one or more models, an auditor, one or more individuals, an expert, an analysist etc.) for an action. The reviewer may be prompted to select another source, update prompts and queries in the prompting and mapping process 400, among other actions. Alternatively, if a first source includes more than half of the keywords, key concepts, regulatory information, or phrases are mentioned in a second source, the models may determine that the content of the first source sufficiently maps to the content of the second source. Once the thresholding process determines that the content of the one or more input sources meets the overlap threshold, it may organize and map the content to a framework 504, which may be the same as framework 404. While a fifty percent content overlap score threshold is described, it should be understood that a sufficient overlap threshold may be higher or lower. Additionally, while a process of comparing keywords, key concepts, regulatory information, or phrases between sources is described to determine the overlap score, it should be understood that the overlap score may be computed using alternative methods. Scoring may be based on the overlap between the regulatory framework and the content of new input documents, with thresholding on the scores used to determine significance.

In some embodiments, the thresholding is adaptive or variable to the desired level of detail to capture. The level of detail may be measured through a correlation, which is the semantic similarity between the documents compared during thresholding. The correlation may measure how close two sentences are to one another based on their meaning. The system 500 may employ a sentence similarity model to convert input texts into vectors or embeddings that capture semantic information so that their similarity can be measured. To capture a higher level of detail (or correlation), the system may employ a higher threshold, which means that there are fewer overlaps, and that these overlaps are the ones the most highly correlated (from the control matrix to the regulatory document, guidance, or standard). To capture a lower level of detail (or correlation), the system may employ a lower threshold, which means there are more overlaps, and that they are the ones less correlated (from the control matrix to the regulatory document, guidance, or standard). To summarize, a low overlap is conservative—it captures more detail, but the minimum correlation between items is lower. A high overlap is permissive—it captures less detail, but the minimum correlation between items is higher. Overall, this thresholding may be used from high to low to prioritize feature design from "must haves" to "could haves."

Figure 6:
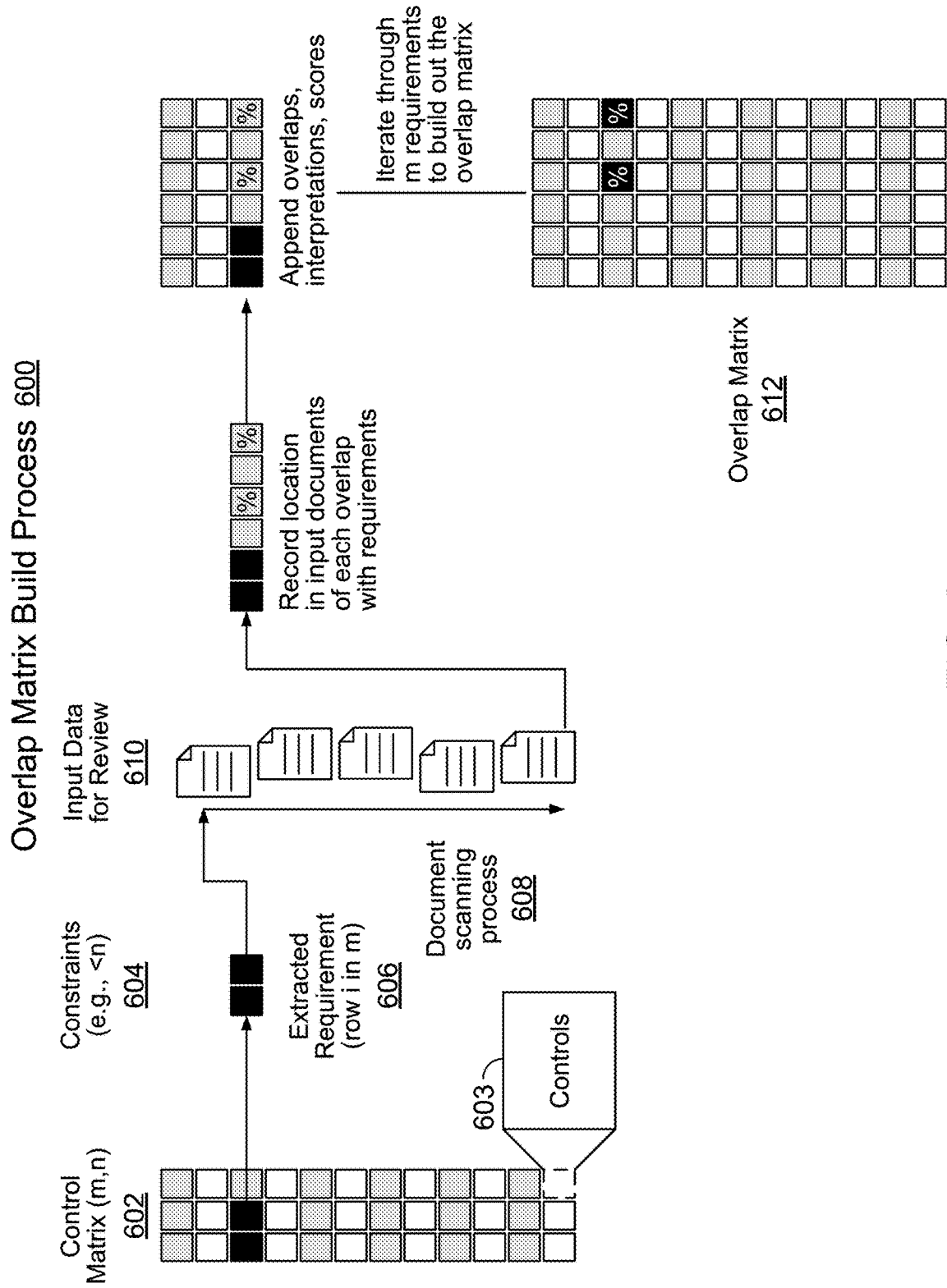
FIG. 6 is a flow diagram of a process for building an overlap matrix.

FIG. 6 describes the overlap matrix build process 600. The process 600 may occur one or more times within the regulatory intelligence evaluation system 100. The process 600 uses a two dimensional (m,n) control matrix 602 as an input and outputs the overlap matrix 612. The control matrix (m,n) 602 described above represents an organized matrix of "controls" 603 (e.g., document requirements, guidelines, criteria, etc.). Each row of the control matrix (m,n) 602 may represent a specific regulation or identified key piece of information, and the columns may provide information about the function of the information, the category of the information (e.g., a law, regulation, a guidance, etc.), and the ID related to the information. For example, an ID of "REG" may identify the information in the row as a regulation. It should be understood that the columns may include other information to sort, map, and identify the key regulatory intelligence. In some implementations, the control matrix (m,n) 602 is built based on a prior search of regulatory documents using the regulatory intelligence evaluation system 100. In some implementations, the control matrix (m,n) 602 is configured manually by a user (e.g., an expert, one or more models, etc.) by compiling, sorting and mapping one or more controls 603 to the control matrix (m,n) 602. In some implementations, a regulatory framework is used instead of the control matrix in process 600.

A system administrator may provide one or more evaluation constraints 604 to evaluate specific rows or columns from the control matrix (m,n) 602. For example, the system administrator may instruct the regulatory intelligence evaluation system 100 to exclude evaluation of the last column in the control matrix (m,n) 602 (evaluating <n columns). Based on the one or more evaluation constrains 604, the overlap matrix build process 600 conducts a requirement extraction process 606, wherein the system extracts each requirement that fits within the one or more constraints 604 by row. For each extracted requirement 606, the overlap matrix build process then conducts a document scanning process 608 to determine how the extracted requirement maps or overlaps with input data for review 610. As described in more detail above, the input data for review 610 may be identified during the collection and aggregation process 300, such that the input data for review 610 may include information from one or more guidance, regulation, standards, and/or precedent documents, among others.

The process 600 may employ a second set of models to complete the tasks described in process 600. The second set of models may include one or more natural language processing models, such as text/document classification, sentiment analysis, information retrieval, parts of speech tagging, language detection and machine translation, conversational agents, knowledge graphs and QA systems. The second set of models may also include one or more large language models, such as OpenAI's GPT series (e.g., GPT-4.5, GPT-4-), Google's Gemini and BERT models, Meta's LLaMA family, Anthropic's Claude models, and Mistral AI's models, among others. The second set of models may be referred to as one or more models.

One or more models record the location of each extracted requirement 606 in the input data for review 610. The models may also determine each instance of overlap between the extracted requirement 606 with the input data for review 610. Once all the input data 610 is reviewed, the system assigns an overlap score for each of the requirements in relation to the input data for review 610. The location information of the extracted requirements in the input data and the overlap score(s) are appended to the end of the extracted requirement. Overall, the overlap matrix build process 600 records the extracted requirement location in input documents 610 of each overlap with requirements, and the process 600 adds an interpretation of why there is an overlap and an overlap percentage or score. Adding such interpretations may facilitate the review process for reviewers in the loop. The overlap matrix build process 600 iterates through m rows and n columns (or through the rows and columns limited by the constraints 604) to build out the overlap matrix 612. In some implementations, the overlap matrix build process 600 appends two columns to each requirement per source. In some embodiments, one of the two columns references the location of the regulation in the source, and the other column may represent the overlap between this regulation and the regulation from the overlap matrix 602. In another embodiment, one of the columns represents the overlap between this regulation and the regulation from the overlap matrix 602, and the second column may represent the interpretation for why there is an overlap between the regulation and the regulation from the overlap matrix. While a two dimensional (m,n) control matrix input is described, it should be understood that the matrix structure may employ alternative dimensions, and that the matrix may be organized in many different ways. For case of presentation, the figure depicts a row of an extracted requirement, wherein the columns in the row represent the requirement, overlap, interpretation, and score. Finally, it should be understood that, in some implementations, the order between the requirement to document review may be reversed (e.g., in horizon scanning in which news alerts are compared with the control matrix).

Figure 7:
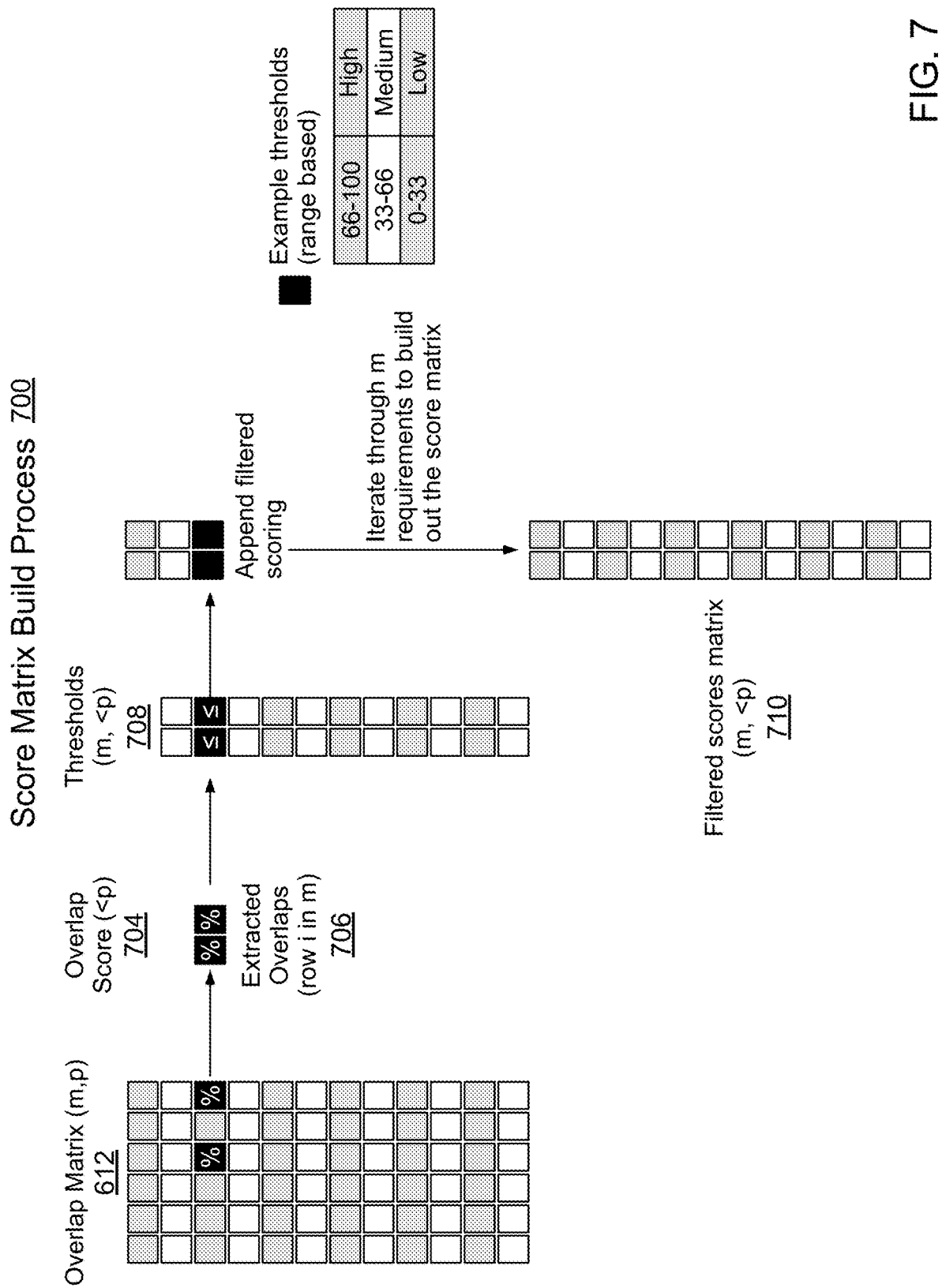
FIG. 7 is a flow diagram of a process for building a score matrix.

FIG. 7 describes the score matrix build process 700. The process 700 may occur one or more times within the regulatory intelligence evaluation system 100. The process 700 uses a two dimensional (m,p) overlap matrix 612 (which was an output from the overlap matrix build process 600) as an input, and it outputs the filtered scores matrix 712. The overlap matrix (m,p) 612 may include information about one or more regulations and their overlap score with a set of input documents identified during a collection and aggregation process 300. A system administrator may provide one or more overlap score evaluation constraints 704 to evaluate specific rows or columns from the overlap matrix (m,n) 612. For example, the system administrator may instruct the regulatory intelligence evaluation system 100 to extract only information about the extracted overlap scores and the corresponding regulation. Additionally, a system administrator may specify a threshold constrains 708, wherein each extracted overlap 706 must meet a threshold constraint. Thresholds 708 may include ranges, or they come from guardrails, in which case the scoring is weighted and adjusted accordingly. Guardrails may be set by experts on the regulatory topic, or they may be set by one or more models to threshold the degree of overlap.

Based on the one or more overlap score evaluation constrains 704, the score matrix build process 700 extracts overlaps 706 by row and compares the overlap score information in the row to the specified threshold 708. The system identifies whether the overlap score information from the extracted overlaps 706 meets the threshold 708. Alternatively, the system may employ a range-based thresholding system, wherein each extracted overlap 706 is assigned to a threshold range. For example, a high threshold range may correspond to an overlap score of 66-100%. A medium threshold range may correspond to overlap scores of 33-66. A low threshold range may correspond to overlap scores of 0-33. The system appends information to the extracted overlaps 706 to identify which threshold the overlap is associated with (e.g., high, medium, or low overlap). The matrix build process 700 may repeat this process and iterate through each extracted overlap to build out the filtered scores matrix 710. While an iterative process is described, the score, overlap and thresholds may be interpreted in a single step using vector-based operations (eliminating the iterative process shown). In some implementation, the importance of each document can also be weighed, to adjust the score by importance. For example, legal documents may be weighed higher (e.g., a weight of 1) while other documents may be weighted lower. For example, regulatory guidance documents may be weighted 0.75, industry standards may be weighted 0.5, etc. In this example, legal and regulatory documents are the most important factor. In other embodiments, other documents may have a higher weight, depending on the sector, project goals, and industry of the user. In some embodiments, weighting is selected by expert.

Figure 8:
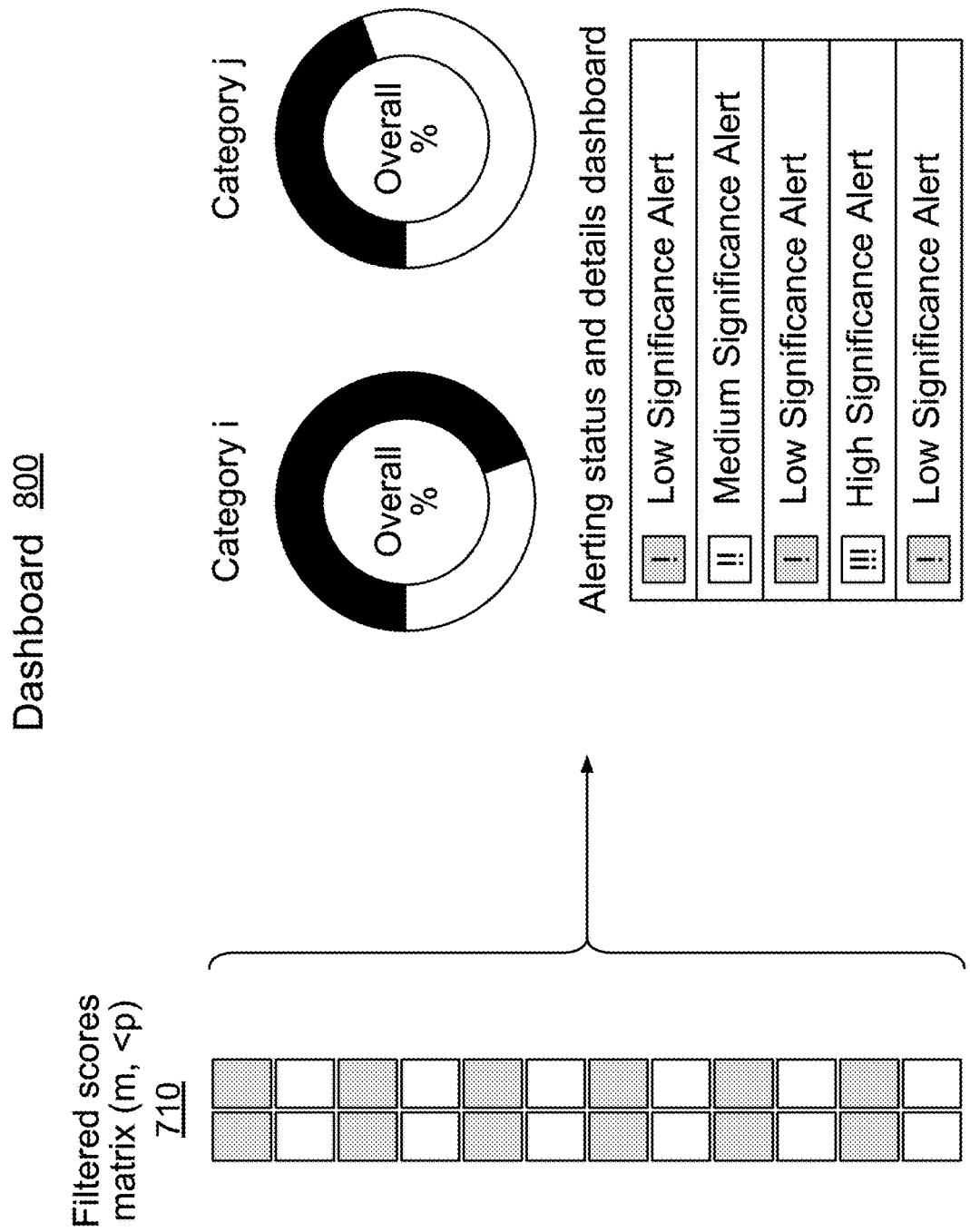
FIG. 8 illustrates an example dashboard that can be used to display alerts based on the overlap detected using a regulatory intelligence evaluation system.

FIG. 8 depicts a dashboard 800, wherein the dashboard displays information from the filtered scores matrix 710 to a user. The dashboard 800 may be displayed one or more times within the regulatory intelligence evaluation system process 200. The dashboard 800 displays an overall overlap score for different categories (e.g., category I, category J). Requirements can be summarized by functional categories (e.g., cybersecurity domains), by score categories (e.g., low, medium, or high scores), or by functional areas in a control matrix (e.g., clauses in a standard document, or laws in a regulation document). Requirements can also be summarized across different categories. In an example scenario, a system user conducted a regulatory search for two topics a year ago (privacy laws for category I, and AI laws for category J). A year later, they conducted the same search for both categories and found that category I's overlap with the previous search is higher than category J. This may indicate that privacy laws in category I have not changed as significantly in the past year compared to AI laws (category J). The score from the filtered scores matrix 710 may be mapped to a specific regulation, category, or control from the control matrix, which may map the overlap score to a specific topic. Furthermore, using the range-based thresholding system described above, the system may provide an alert status for a specific category, control, or regulation. A low significance alert may correspond to a high degree of overlap. A medium significance alert may correspond to a medium overlap score, and a high significance alert may correspond to a low overlap score. The system may only report significant updates based on impacted requirements (e.g., the requirements from a medical device application in which a news alert indicates regulatory change). Additionally, or alternatively, the dashboard 800 may provide strategic recommendations to a user by weighing the significance of the input documents described above. For example, the dashboard 800 and/or system 100 may weight legal and regulatory documents more heavily than interpretive guidance documents. Overall, the dashboard 800 allows users to quickly scan regulatory intelligence and determine which categories in the intelligence have a high significance to their sector, business, or projects.

Overall, FIGS. 6-8 highlight one process of (1) building an overlap matrix, (2) building a score matrix, and (3) summarizing overlap score results. This process can be parallelized. For example, this process can be run in parallel across multiple artificial intelligence models.

Figure 9:
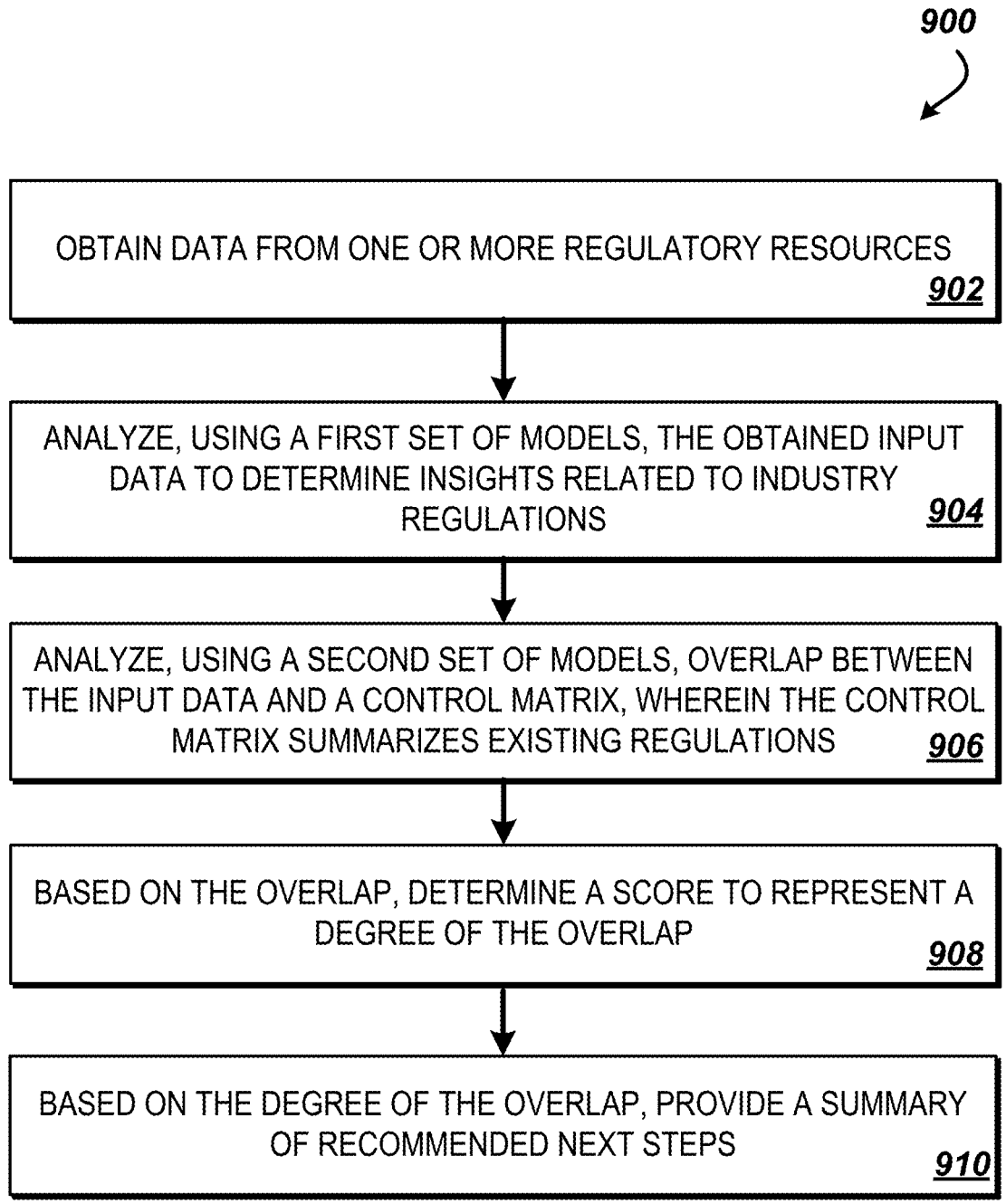
FIG. 9 is a flow diagram of a process for detecting and evaluating an interaction.

FIG. 9 is a flow diagram of an example process for detecting and evaluating an interaction. For convenience, the process 900 will be described as being performed by a system of one or more computers located in one or more locations. For example, a regulatory intelligence evaluation system, e.g., the regulatory intelligence evaluation system 100 of FIG. 1, appropriately programmed in accordance with this specification, can perform the process 900. As shown, the process 900 may first obtain data from one or more regulatory resources. The system analyzes, using a first set of models, the obtained input data to determine insights related to industry regulations. The system further analyzes, using a second set of models, overlap between the input data and a control matrix, wherein the control matrix summarizes existing regulations. Based on the overlap, the system determines a score to represent a degree of the overlap. Finally, based on the degree of the overlap, the system provides a summary of recommended next steps.

In an example approach, a system accesses a control data structure (e.g., the control matrix), wherein the control data structure includes one or more compliance requirements associated with a regulation, and wherein the control data structure is stored in a database. The system may receive, via a client user interface, one or more documents representing an operational process performed by the client, wherein the operational process is subject to the regulation. The system may identify, using one or more AI models configured to communicate with the database, at least a portion of the operational process disclosed in the document that overlaps with the one or more compliance requirements of the regulation. The system may calculate an overlap score for the identified portion of the document based on one or more quality thresholds provided via the user interface, and the system may calculate an overlap score for the identified portion of the document based on one or more quality thresholds provided via the user interface. Finally, the system may output, via the user interface, the overlap score, wherein the overlap score represents a degree of compliance between the operational process and the compliance requirements of the regulation. In an embodiment, the overlap score for the operational process may be recalculated upon determining there has been a change in one or more compliance requirements.

Figure 10:
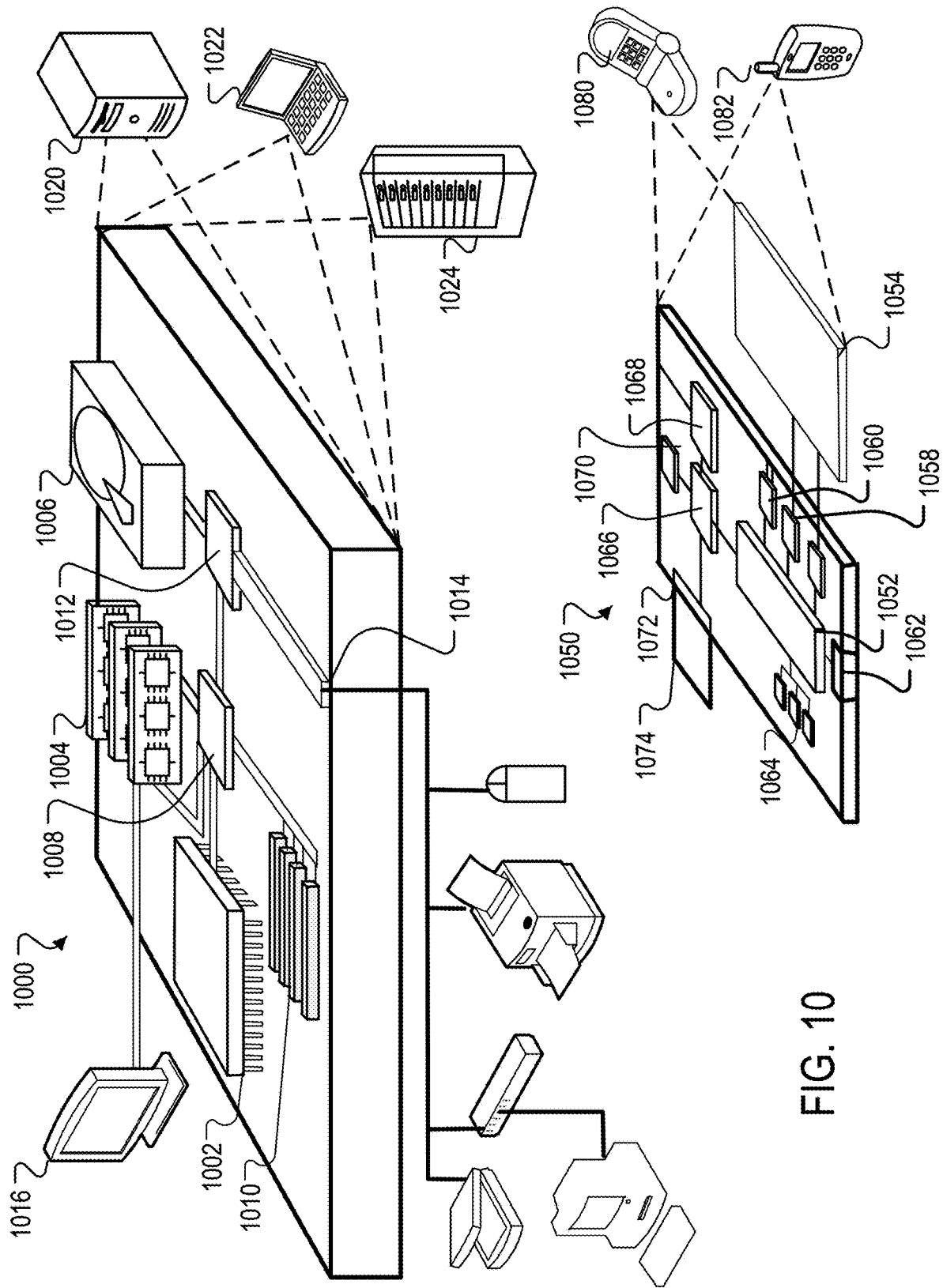
FIG. 10 illustrates an example of a computing device and a mobile computing device.

FIG. 10 shows an example of example computer device 1000 and example mobile computer device 1050, which can be used to implement the techniques described herein. For example, a portion or all of the operations for detecting and analyzing interactions in an audio stream, etc. may be executed by the computer device 1000 and/or the mobile computer device 1050. Computing device 1000 is intended to represent various forms of digital computers, including, e.g., laptops, desktops, workstations, personal digital assistants, servers, blade servers, mainframes, and other appropriate computers. Computing device 1050 is intended to represent various forms of mobile devices, including, e.g., personal digital assistants, tablet computing devices, cellular telephones, smartphones, and other similar computing devices. The components shown here, their connections and relationships, and their functions, are meant to be examples only, and are not meant to limit implementations of the techniques described and/or claimed in this document.

Computing device 1000 includes processor 1002, memory 1004, storage device 1006, high-speed interface 1008 connecting to memory 1004 and high-speed expansion ports 1010, and low-speed interface 1012 connecting to low-speed bus 1014 and storage device 1006. Each of components 1002, 1004, 1006, 1008, 1010, and 1012, are interconnected using various busses, and can be mounted on a common motherboard or in other manners as appropriate. Processor 1002 can process instructions for execution within computing device 1000, including instructions stored in memory 1004 or on storage device 1006 to display graphical data for a GUI on an external input/output device, including, e.g., display 1016 coupled to high-speed interface 1008. In other implementations, multiple processors and/or multiple busses can be used, as appropriate, along with multiple memories and types of memory. Also, multiple computing devices 1000 can be connected, with each device providing portions of the necessary operations (e.g., as a server bank, a group of blade servers, or a multi-processor system).

Memory 1004 stores data within computing device 1000. In one implementation, memory 1004 is a volatile memory unit or units. In another implementation, memory 1004 is a non-volatile memory unit or units. Memory 1004 also can be another form of computer-readable medium (e.g., a magnetic or optical disk. Memory 1004 may be non-transitory.)

Storage device 1006 is capable of providing mass storage for computing device 1000. In one implementation, storage device 1006 can be or contain a computer-readable medium (e.g., a floppy disk device, a hard disk device, an optical disk device, or a tape device, a flash memory or other similar solid state memory device, or an array of devices, such as devices in a storage area network or other configurations.) A computer program product can be tangibly embodied in a data carrier. The computer program product also can contain instructions that, when executed, perform one or more methods (e.g., those described above.) The data carrier is a computer- or machine-readable medium, (e.g., memory 1004, storage device 1006, memory on processor 1002, and the like.)

High-speed controller 1008 manages bandwidth-intensive operations for computing device 1000, while low-speed controller 1012 manages lower bandwidth-intensive operations. Such allocation of functions is an example only. In one implementation, high-speed controller 1008 is coupled to memory 1004, display 1016 (e.g., through a graphics processor or accelerator), and to high-speed expansion ports 1010, which can accept various expansion cards (not shown). In the implementation, low-speed controller 1012 is coupled to storage device 1006 and low-speed expansion port 1014. The low-speed expansion port, which can include various communication ports (e.g., USB, Bluetooth®, Ethernet, wireless Ethernet), can be coupled to one or more input/output devices, (e.g., a keyboard, a pointing device, a scanner, or a networking device including a switch or router, e.g., through a network adapter.)

Computing device 1000 can be implemented in a number of different forms, as shown in the figure. For example, it can be implemented as standard server 1020, or multiple times in a group of such servers. It also can be implemented as part of rack server system 1024. In addition or as an alternative, it can be implemented in a personal computer (e.g., laptop computer 1022.) In some examples, components from computing device 1000 can be combined with other components in a mobile device (not shown), e.g., device 1050. Each of such devices can contain one or more of computing device 1000, 1050, and an entire system can be made up of multiple computing devices 1000, 1050 communicating with each other.

Computing device 1050 includes processor 1052, memory 1064, an input/output device (e.g., display 1054, communication interface 1066, and transceiver 1068) among other components. Device 1050 also can be provided with a storage device, (e.g., a microdrive or other device) to provide additional storage. Each of components 1050, 1052, 1064, 1054, 1066, and 1068, are interconnected using various buses, and several of the components can be mounted on a common motherboard or in other manners as appropriate.

Processor 1052 can execute instructions within computing device 1050, including instructions stored in memory 1064. The processor can be implemented as a chipset of chips that include separate and multiple analog and digital processors. The processor can provide, for example, for coordination of the other components of device 1050, e.g., control of user interfaces, applications run by device 1050, and wireless communication by device 1050.

Processor 1052 can communicate with a user through control interface 1058 and display interface 1056 coupled to display 1054. Display 1054 can be, for example, a TFT LCD (Thin-Film-Transistor Liquid Crystal Display) or an OLED (Organic Light Emitting Diode) display, or other appropriate display technology. Display interface 1056 can comprise appropriate circuitry for driving display 1054 to present graphical and other data to a user. Control interface 1058 can receive commands from a user and convert them for submission to processor 1052. In addition, external interface 1062 can communicate with processor 1042, so as to enable near area communication of device 1050 with other devices. External interface 1062 can provide, for example, for wired communication in some implementations, or for wireless communication in other implementations, and multiple interfaces also can be used.

Memory 1064 stores data within computing device 1050. Memory 1064 can be implemented as one or more of a computer-readable medium or media, a volatile memory unit or units, or a non-volatile memory unit or units. Expansion memory 1074 also can be provided and connected to device 1050 through expansion interface 1072, which can include, for example, a SIMM (Single In Line Memory Module) card interface. Such expansion memory 1074 can provide extra storage space for device 1050, or also can store applications or other data for device 1050. Specifically, expansion memory 1074 can include instructions to carry out or supplement the processes described above and can include secure data also. Thus, for example, expansion memory 1074 can be provided as a security module for device 1050 and can be programmed with instructions that permit secure use of device 1050. In addition, secure applications can be provided through the SIMM cards, along with additional data, (e.g., placing identifying data on the SIMM card in a non-hackable manner.)

The memory 1064 can include, for example, flash memory and/or NVRAM memory, as discussed below. In one implementation, a computer program product is tangibly embodied in a data carrier. The computer program product contains instructions that, when executed, perform one or more methods, e.g., those described above. The data carrier is a computer- or machine-readable medium (e.g., memory 1064, expansion memory 1074, and/or memory on processor 1052), which can be received, for example, over transceiver 1068 or external interface 1062.

Device 1050 can communicate wirelessly through communication interface 1066, which can include digital signal processing circuitry where necessary. Communication interface 1066 can provide for communications under various modes or protocols (e.g., GSM voice calls, SMS, EMS, or MMS messaging, CDMA, TDMA, PDC, WCDMA, CDMA2000, or GPRS, among others.) Such communication can occur, for example, through radio-frequency transceiver 1068. In addition, short-range communication can occur, e.g., using a Bluetooth®, WiFi, or other such transceiver (not shown). In addition, GPS (Global Positioning System) receiver module 1070 can provide additional navigation- and location-related wireless data to device 1050, which can be used as appropriate by applications running on device 1050. Sensors and modules such as cameras, microphones, compasses, accelerators (for orientation sensing), etc. may be included in the device.

Device 1050 also can communicate audibly using audio codec 1060, which can receive spoken data from a user and convert it to usable digital data. Audio codec 1060 can likewise generate audible sound for a user, (e.g., through a speaker in a handset of device 1050.) Such sound can include sound from voice telephone calls, can include recorded sound (e.g., voice messages, music files, and the like) and also can include sound generated by applications operating on device 1050.

Computing device 1050 can be implemented in a number of different forms, as shown in the figure. For example, it can be implemented as cellular telephone 1080. It also can be implemented as part of smartphone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor. The programmable processor can be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms machine-readable medium and computer-readable medium refer to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a device for displaying data to the user (e.g., a CRT (cathode ray tube) or LCD (liquid crystal display) monitor), and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a backend component (e.g., as a data server), or that includes a middleware component (e.g., an application server), or that includes a frontend component (e.g., a client computer having a user interface or a Web browser through which a user can interact with an implementation of the systems and techniques described here), or a combination of such back end, middleware, or frontend components. The components of the system can be interconnected by a form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engines described herein can be separated, combined, or incorporated into a single or combined engine. The engines depicted in the figures are not intended to limit the systems described here to the software architectures shown in the figures.

Figure 11:
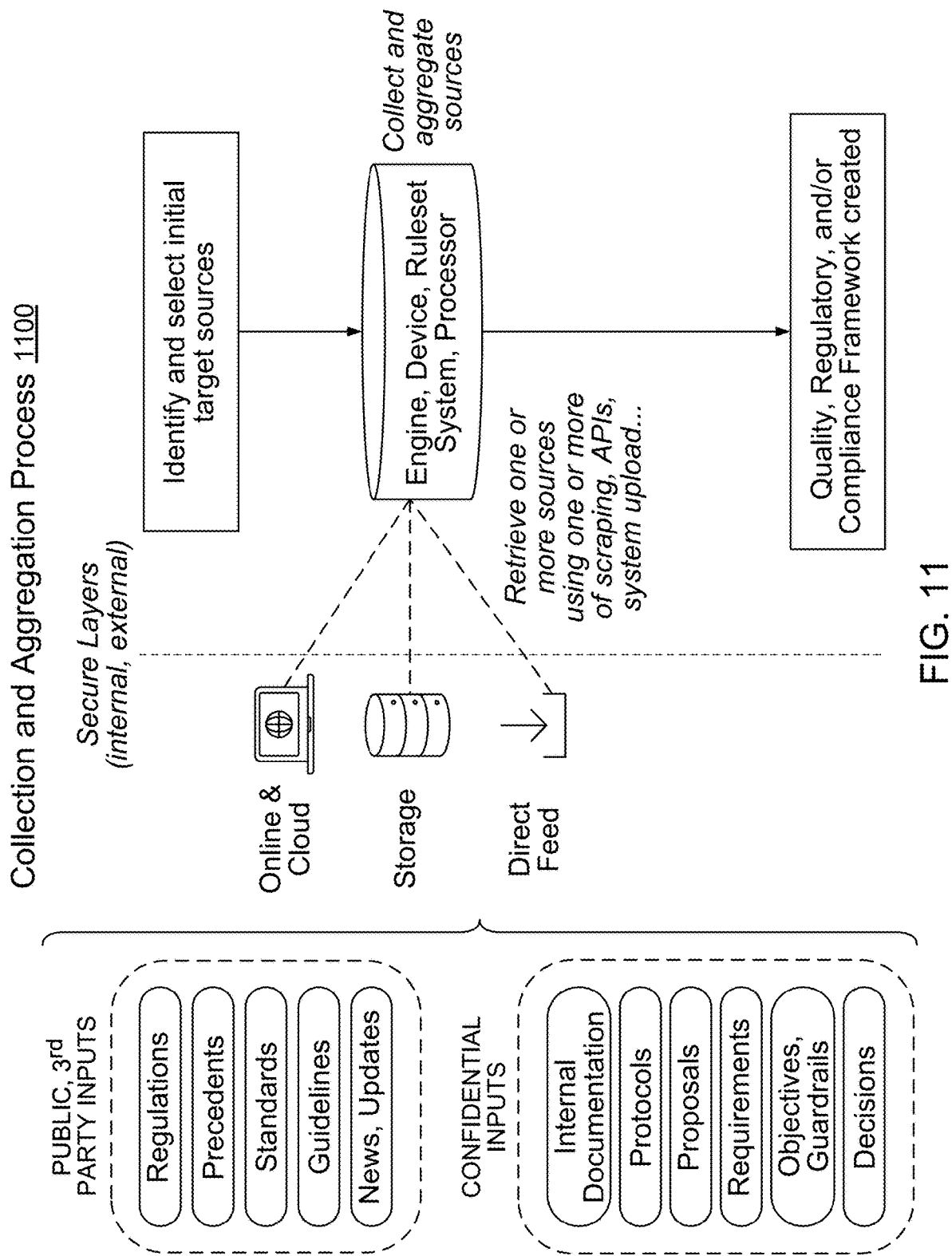
FIG. 11 is a diagram of a collection and aggregation process.

FIG. 11 is a diagram of an example collection and aggregation process 1100. As shown, the engine in the collection and aggregation process 1100 utilizes internal and external secure layers to identify one or more sources. The system can use one or more or a combination of public, $3^{rd}$ party inputs (e.g., regulations, precedents, standards, guidelines, news, updates etc.) and confidential inputs (e.g., internal documentation, protocols, proposals, requirements, objectives, guardrails, decisions, etc.). In some embodiments, the system may process the one or more public, $3^{rd}$ party inputs, or confidential inputs independently through a secure cloud server that is only accessible to a client user. Depending on the use case, the one or more public, $3^{rd}$ party inputs, or confidential inputs may be kept securely separated from all other users through the evaluation process, or the system may bring together the mapped results, while keeping the documents secure.

Figure 12:
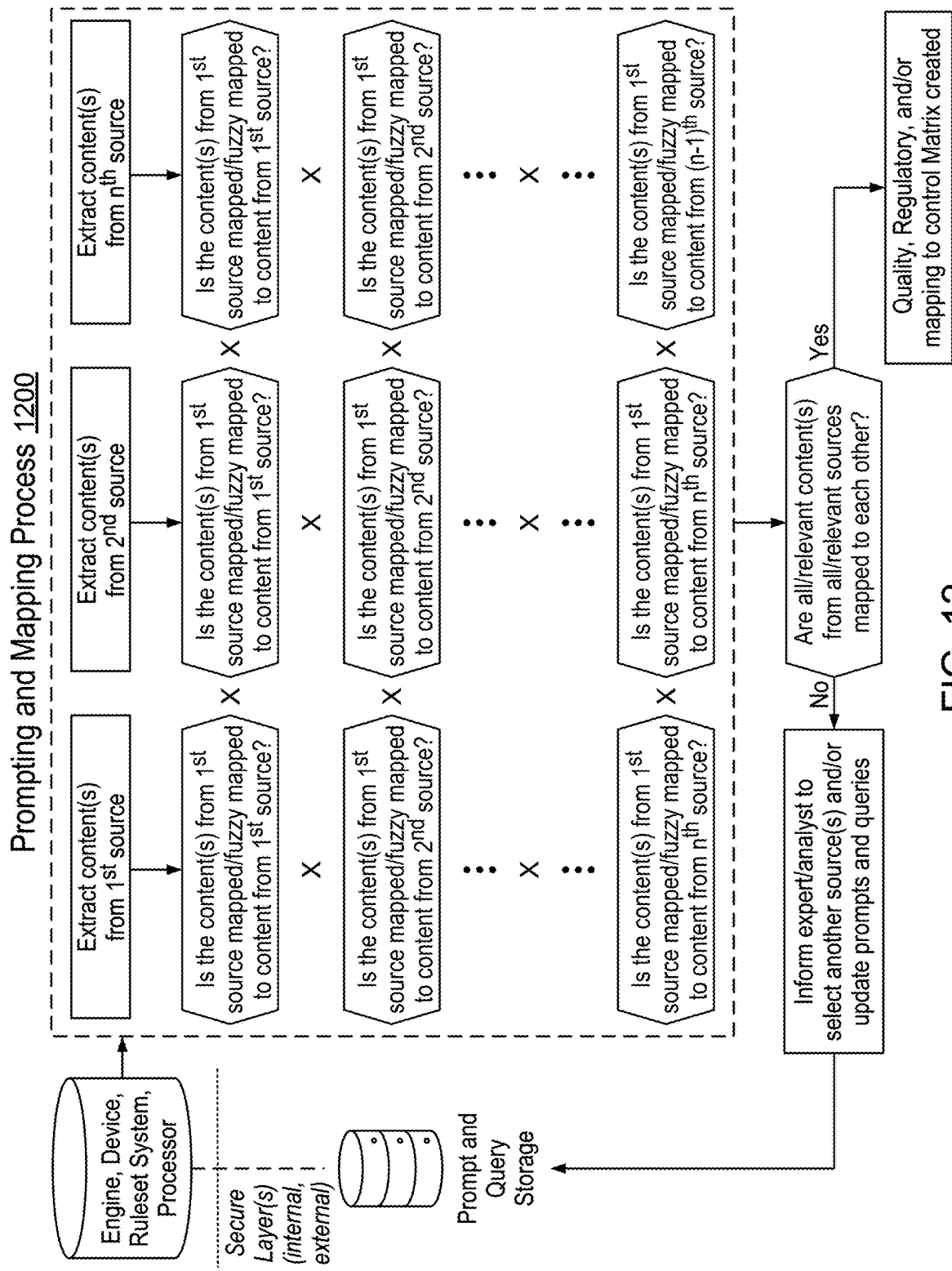
FIG. 12 is a diagram of a prompting and mapping process.

FIG. 12 is a diagram of an example prompting and mapping process 1200. As shown, the engine in the prompting and mapping process 1200 utilizes internal and external secure layers identified in the collection and aggregation process 1100 to extract content from the one or more public and/or confidential sources. The process 1200 maps content(s) between these sources. In an example scenario, a user of a company may like to know if their company's current guidelines on AI use for healthcare solutions aligns with public regulations. The user may upload their own internal company guidelines to the engine of the collection and aggregation process 1100, and the user may instruct the collection and aggregation process 1100 to identify public sources, guidelines, standards, regulations, news, updates etc. The prompting and mapping process 1200 maps the contents of the private company guidelines to the public documentation to determine if the company guidelines sufficiently follow established public guidelines. The following thresholding process described in FIG. 13 may determine if the contents of the private company guidelines sufficiently overlap with established public guidelines.

Figure 13:
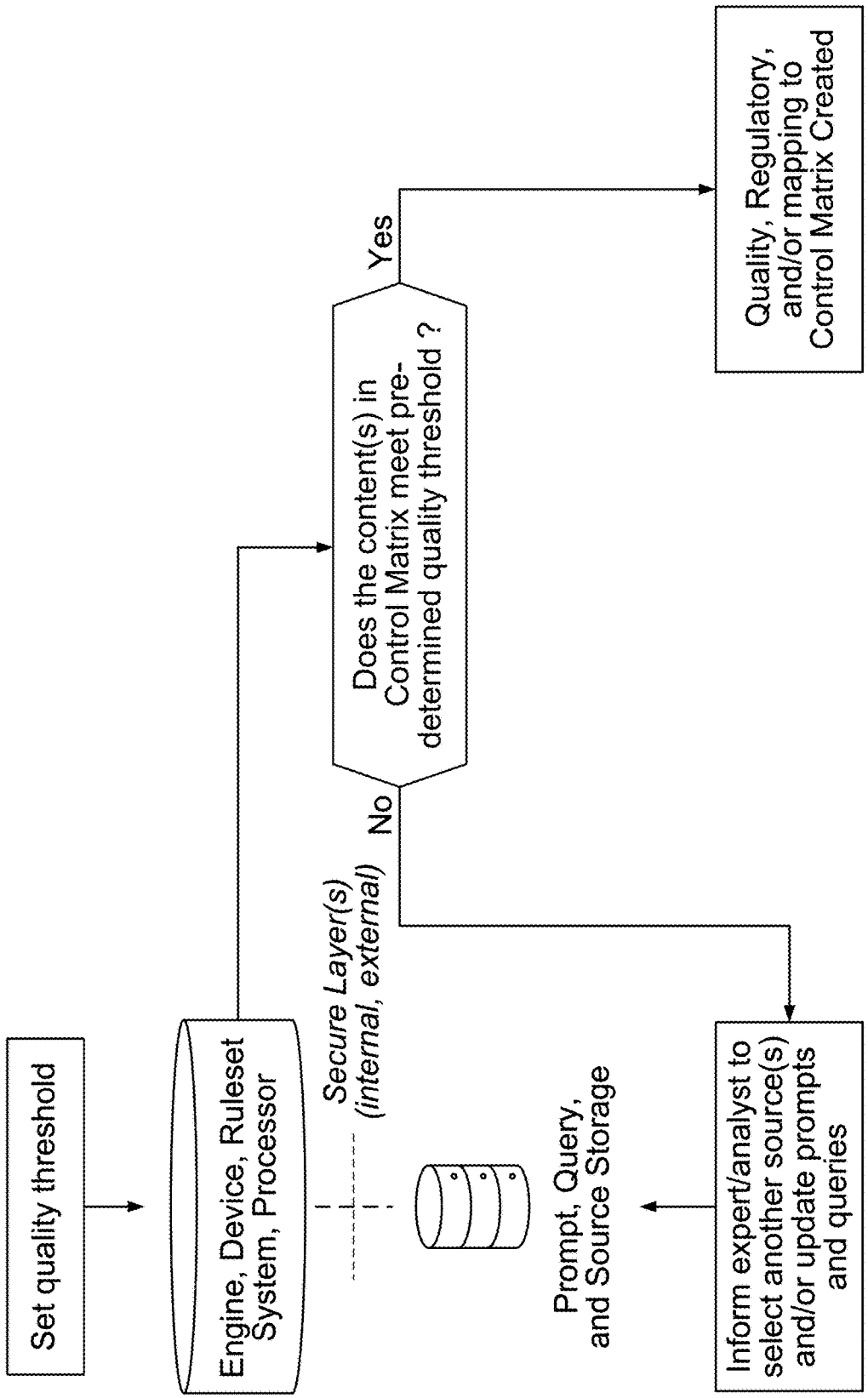
FIG. 13 is a diagram of a thresholding process.

FIG. 13 is a diagram of an example thresholding process 1300. As shown, the engine in the thresholding process 1300 utilizes internal and external secure layers identified in the collection and aggregation process 1100 to determine if overlapping content sufficiently meets a threshold standard. Following the example outlined above, if a company guideline matches public guidelines, this guideline may be extracted to develop a quality, regulatory, or control matrix. If a guideline from the public documents is not found in the internal company guidelines, one or more models in the thresholding process 1300 may prompt a reviewer (e.g., an expert, analyst, one or more models) to review the guideline and determine if it should be included in the final framework. The reviewer(s) may also edit the prompts in the thresholding process 1300, prompting and mapping process 1200, or collection and aggregation process 1100 in response to an information gap detected by the thresholding process.

In some embodiments, the thresholding is adaptive or variable to the desired level of detail to capture. The level of detail may be measured through a correlation, which is the semantic similarity between the documents compared during thresholding. The correlation may measure how close two sentences are to one another based on their meaning. The system 1300 may employ a sentence similarity model to convert input texts into vectors or embeddings that capture semantic information so that their similarity can be measured. To capture a higher level of detail (or correlation), the system may employ a higher threshold, which means that there are fewer overlaps, and that these overlaps are the ones the most highly correlated (from the control matrix to the regulatory document, guidance, or standard). To capture a lower level of detail (or correlation), the system may employ a lower threshold, which means there are more overlaps, and that they are the ones less correlated (from the control matrix to the regulatory document, guidance, or standard). To summarize, a low overlap is conservative—it captures more detail, but the minimum correlation between items is lower. A high overlap is permissive—it captures less detail, but the minimum correlation between items is higher. Overall, this thresholding may be used from high to low to prioritize feature design from "must haves" to "could haves."

Figure 14:
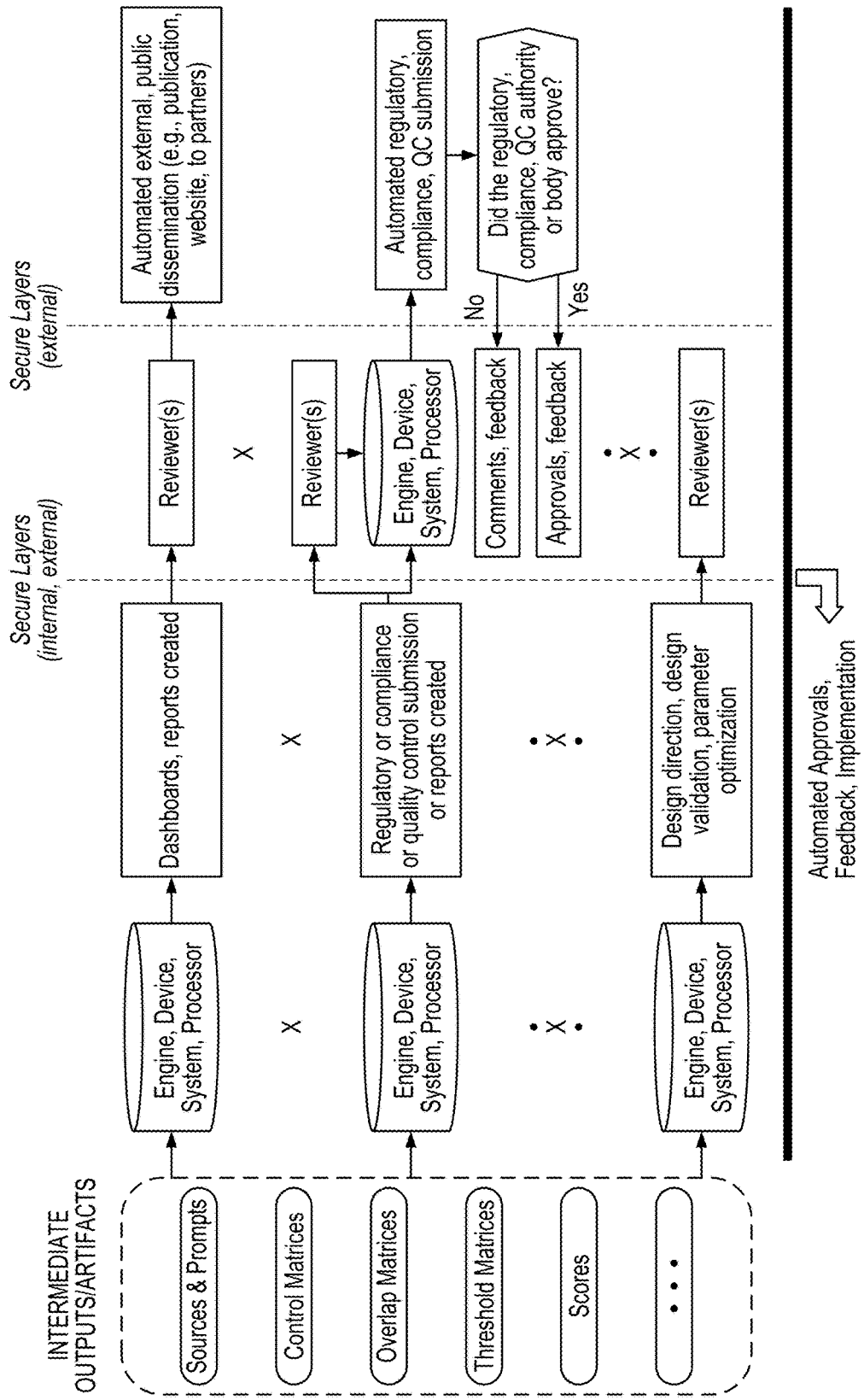
FIG. 14 is a diagram of outputs, application, and feedback.

FIG. 14 is a diagram of outputs, application, and feedback 1400. As shown, the outputs, application, and feedback store intermediate outputs and artifacts (e.g., sources, prompts, control matrices, overlap matrices, threshold matrices, scores, regulatory frameworks etc.) in a database. The intermediate outputs are transmitted to an engine, device, system, or processor, which transform the intermediate artifacts into one or more dashboards, reports, regulatory, compliance, or quality control submissions, design directions, design validations, and/or parameter optimization outputs. These outputs utilize secure layers, and they include internal and external company information. For internal information, the outputs undergo review process, wherein one or more reviewers (e.g., AI models, teams, users, etc.) review the outputs and prepare them for dissemination. Once the outputs are prepared, they can be distributed publicly, or they may be distributed privately within an organization (e.g., to notify the organization of new regulatory or compliance changes).

Figure 15A:
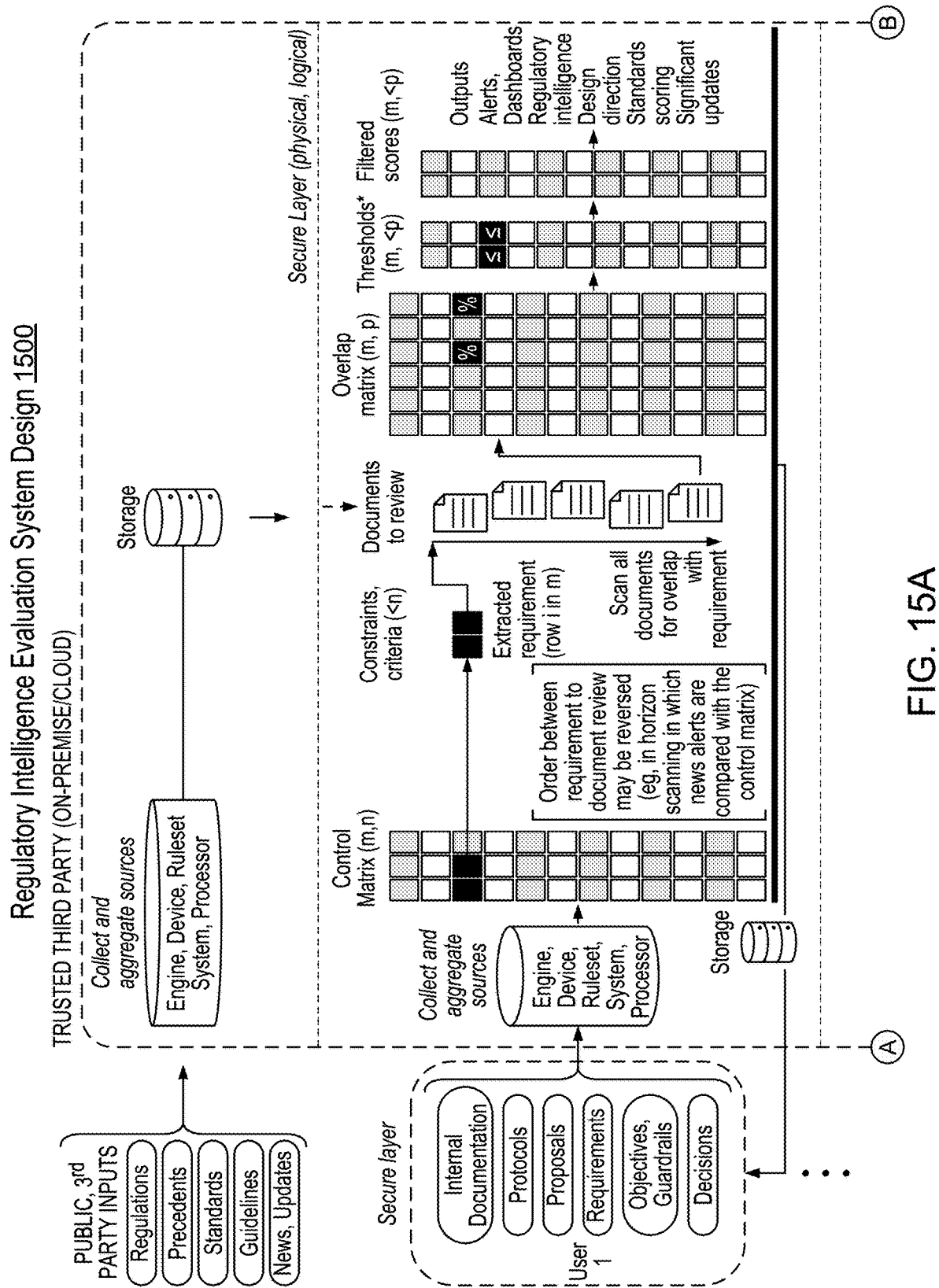
FIGS. 15A-15B are a diagram of a system for evaluating regulatory intelligence.
Figure 15B:
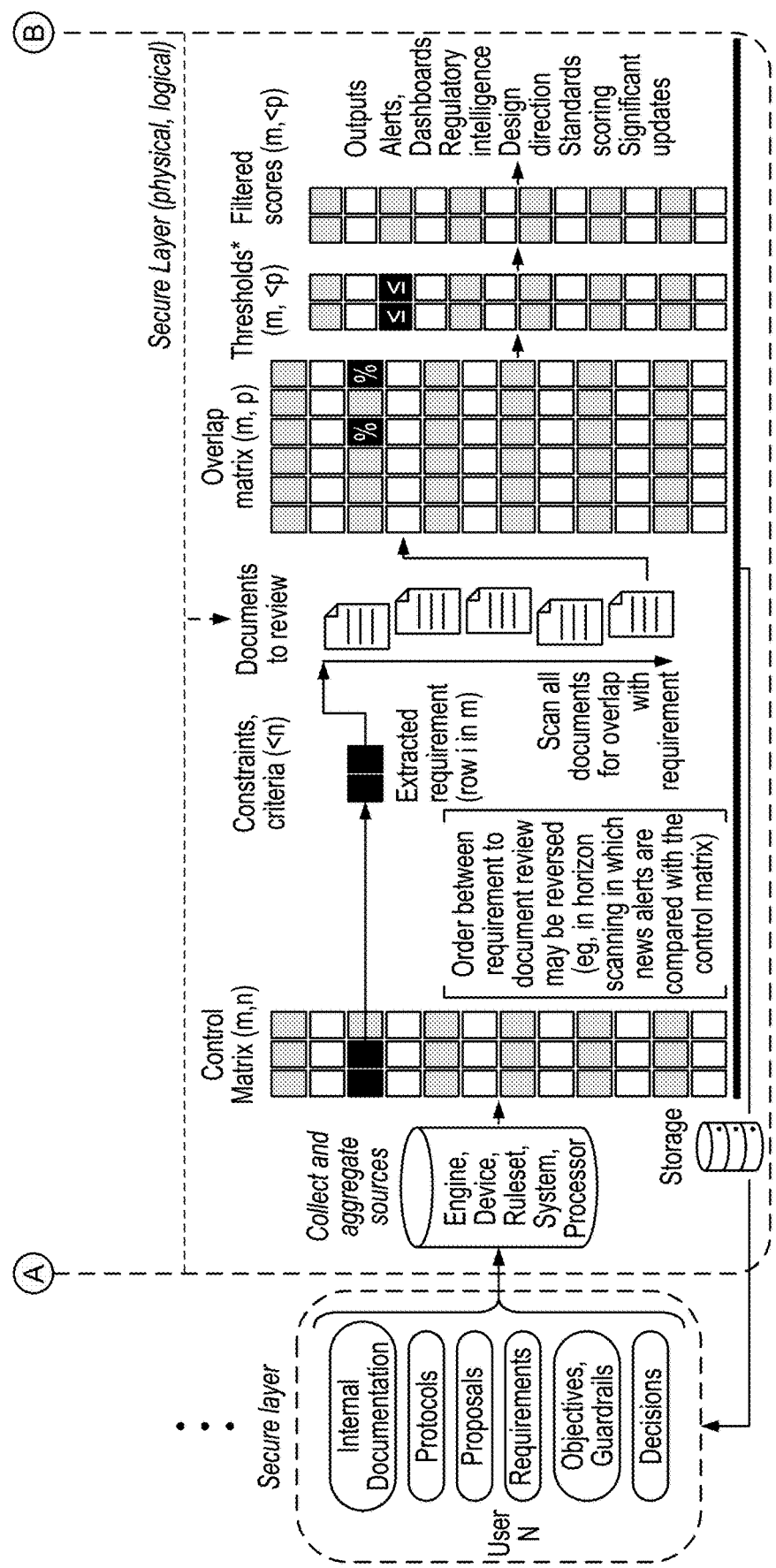

FIG. 15A and FIG. 15B illustrate an example system for evaluating regulatory intelligence 1500. As shown, the system 1500 can process search queries by multiple users separately, and it can separate public and private searches. In some embodiments, the searches can be parallelized, such that one or more models collect and aggregate sources and outputs on different topics in parallel. The system 1500 may use a trusted third party to collect and aggregate sources, and map control matrices, overlap matrices, score matrices, and develop outputs. In some embodiments, the system may process the one or more public, $3^{rd}$ party inputs, or confidential inputs independently through a secure cloud server that is only accessible to a client user. Depending on the use case, the one or more public, $3^{rd}$ party inputs, or confidential inputs may be kept securely separated from all other users through the entire evaluation process, or the system may bring together the mapped results, while keeping the documents secure.

Figure 16A:
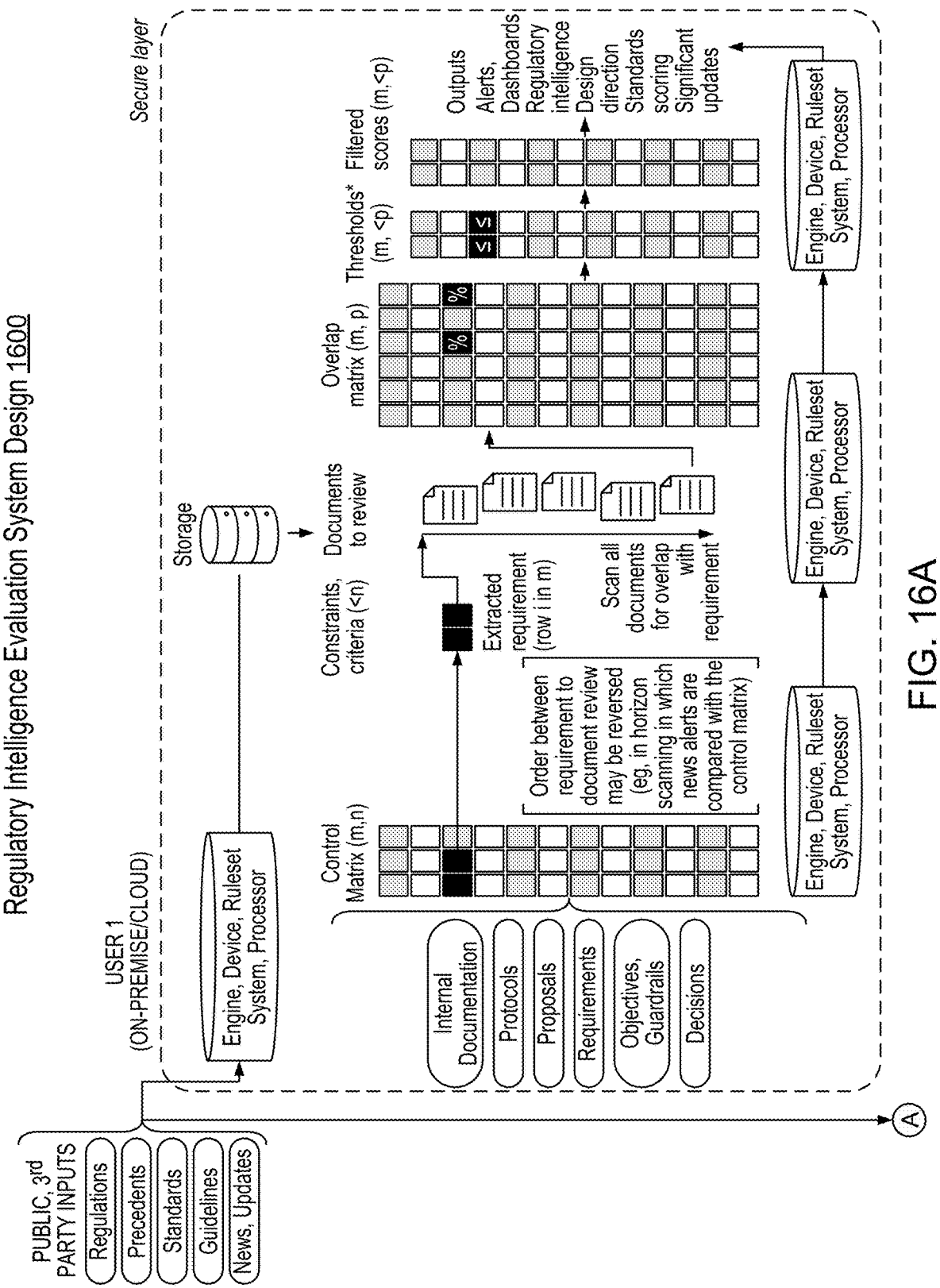
FIGS. 16A-16B are a diagram of a system for evaluating regulatory intelligence.
Figure 16B:
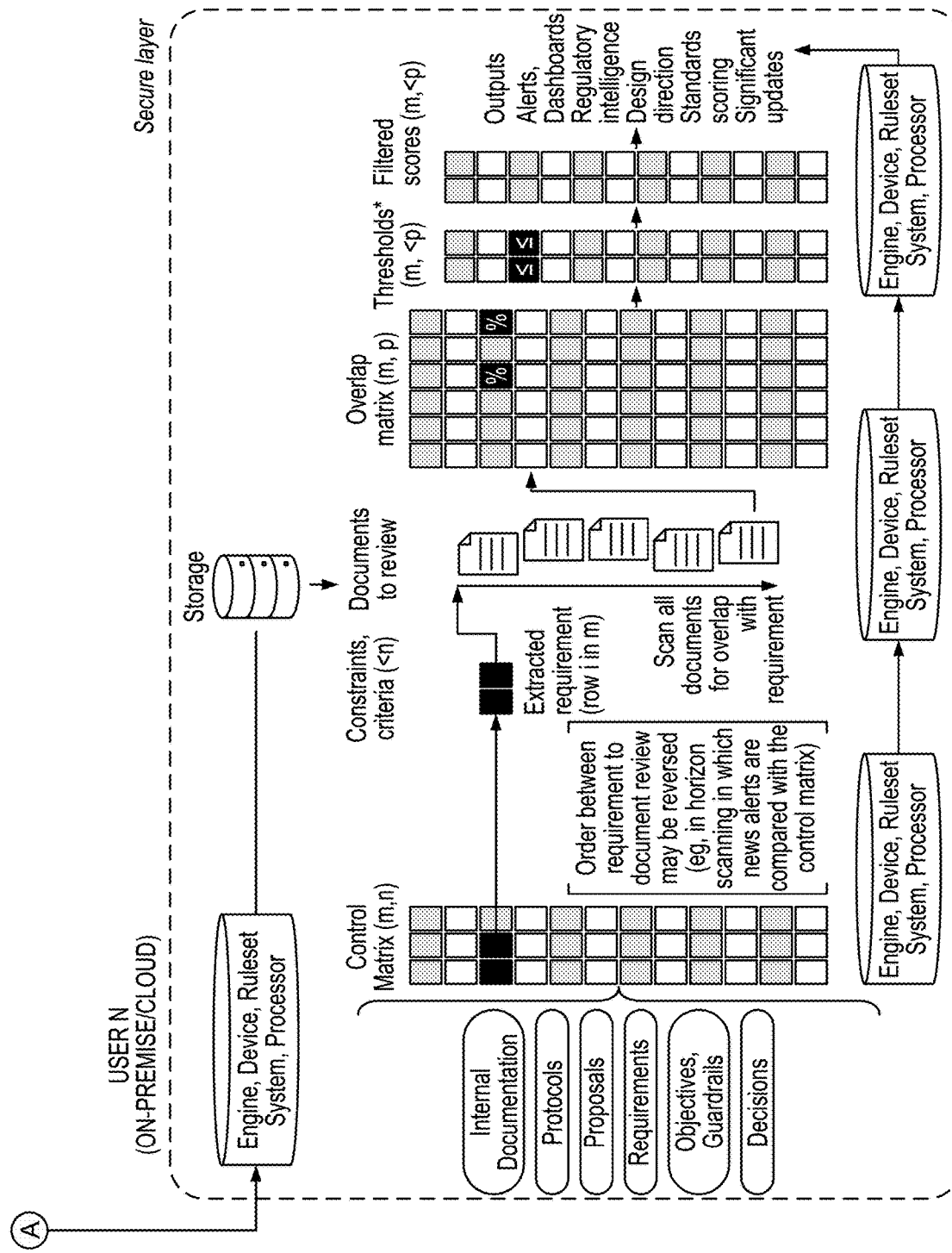

FIG. 16A and FIG. 16B illustrate an example system for evaluating regulatory intelligence 1600. As shown, the system 1600 can process search queries by multiple users separately, and it can separate public and private searches. The system 1600 starts with a set of public $3^{rd}$ party inputs (e.g., regulations, precedents, standards, guidelines, news, updates, etc.), and it may compare the regulatory intelligence from the public inputs to internal company documentation.

Figure 17A:
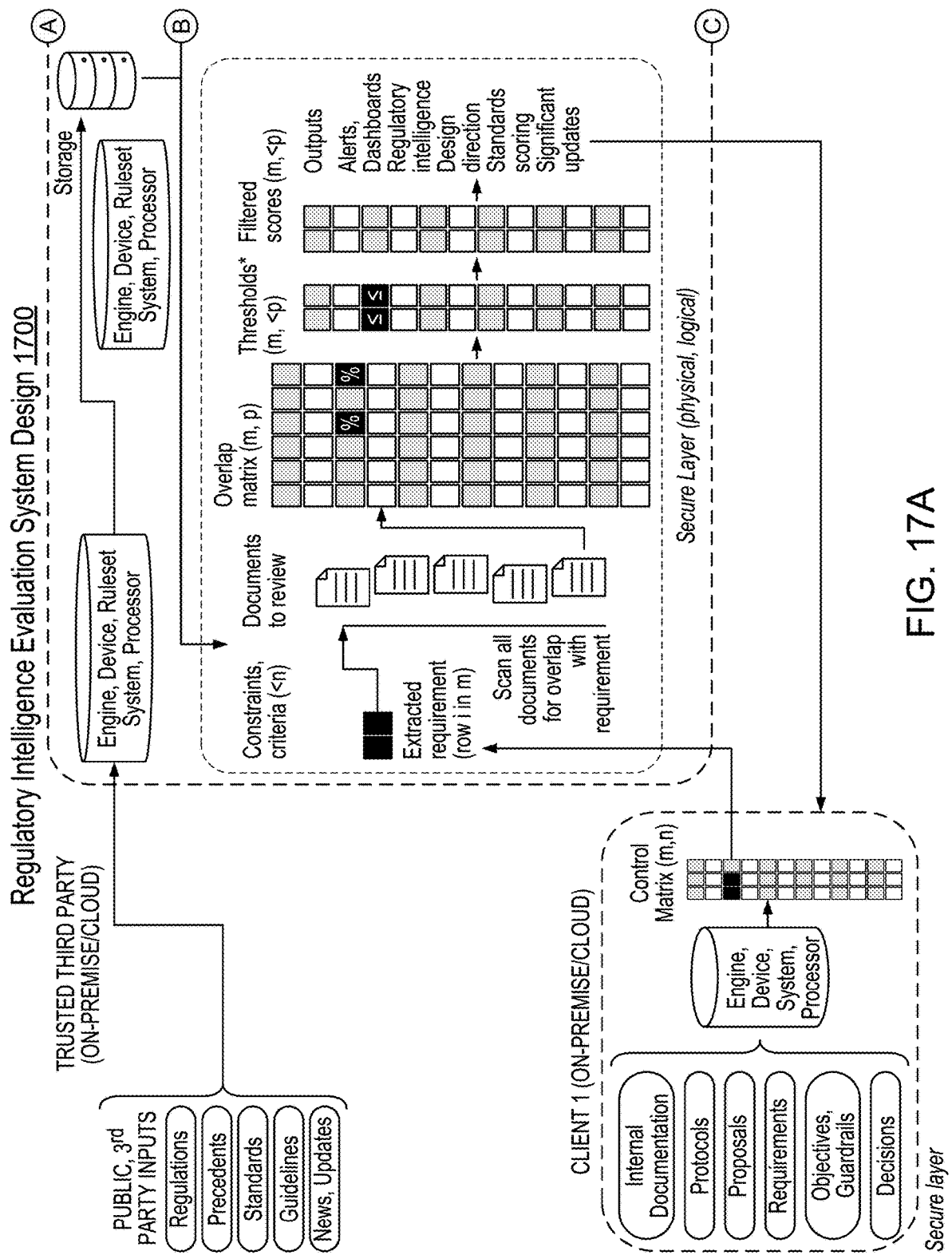
FIG. 17A-17B is a diagram of a system for evaluating regulatory intelligence.
Figure 17B:
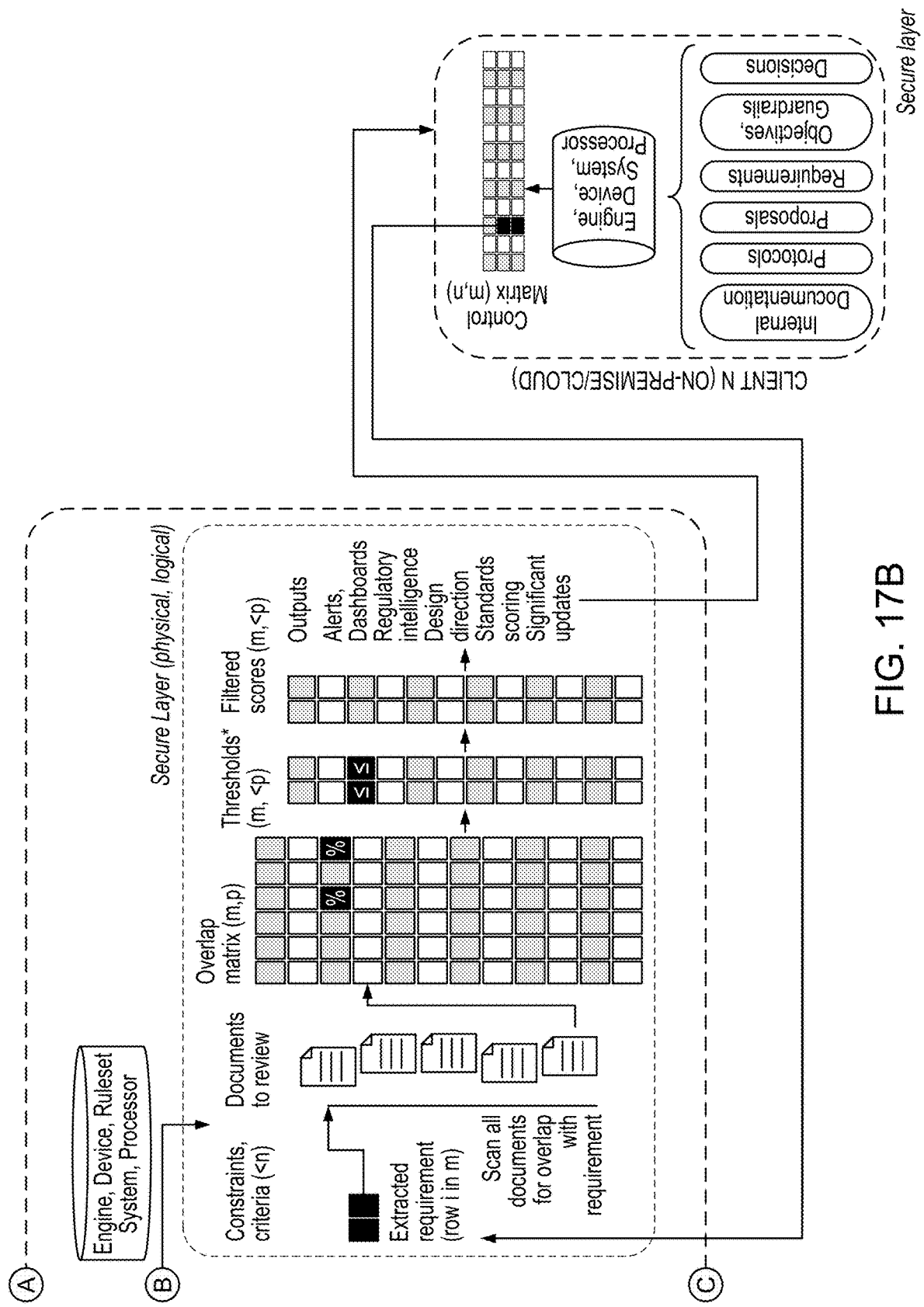

FIG. 17A and FIG. 17B illustrate an example system for evaluating regulatory intelligence 1700. As shown, the system 1700 processes search queries by multiple users separately, and it separates public and private searches. The system 1700 starts with a set of public $3^{rd}$ party inputs (e.g., regulations, precedents, standards, guidelines, news, updates, etc.), and one or more users may input their internal documentation during the overlap matrix build process. As stated above, the system may process the one or more public, $3^{rd}$ party inputs, or confidential inputs independently through a secure cloud server that is only accessible to a client user. Depending on the use case, the one or more public, $3^{rd}$ party inputs, or confidential inputs may be kept securely separated from all other users through the entire evaluation process, or the system may bring together the mapped results, while keeping the one or more documents secure. The cloud configuration of system 1700 includes an extra layer of separation for improved security.

In some implementations, the regulatory intelligence evaluation system employs one or more agents to autonomously complete the evaluation process. The agents may be created by using one or more large language models or machine learning models, such as OpenAI's GPT series (e.g., GPT-4.5, GPT-4-), Google's Gemini and BERT models, Meta's L1aMA family, Anthropic's Claude models, and Mistral AI's models, among others. The agents or machine learning models may be trained using a particular training algorithm. For example, the system may use a gradient descent, which is an iterative optimization algorithm that minimizes differential real-valued functions. The computer system can utilize the trained agents to complete specific tasks in the regulatory evaluation process.

The agents may be specialized in different types or content analysis. For example, some agents may be specialized for content analysis in privacy, while others may specialize in governance, or cybersecurity regulation analysis. Some agents may be specialized to coordinate sub-agents. Also, agents may be specialized to perform specific tasks in the regulatory intelligence evaluation system. For example, some agents may be specialized to develop a control matrix, while others may be specialized to create the filtered scores matrix.

Figure 18A:
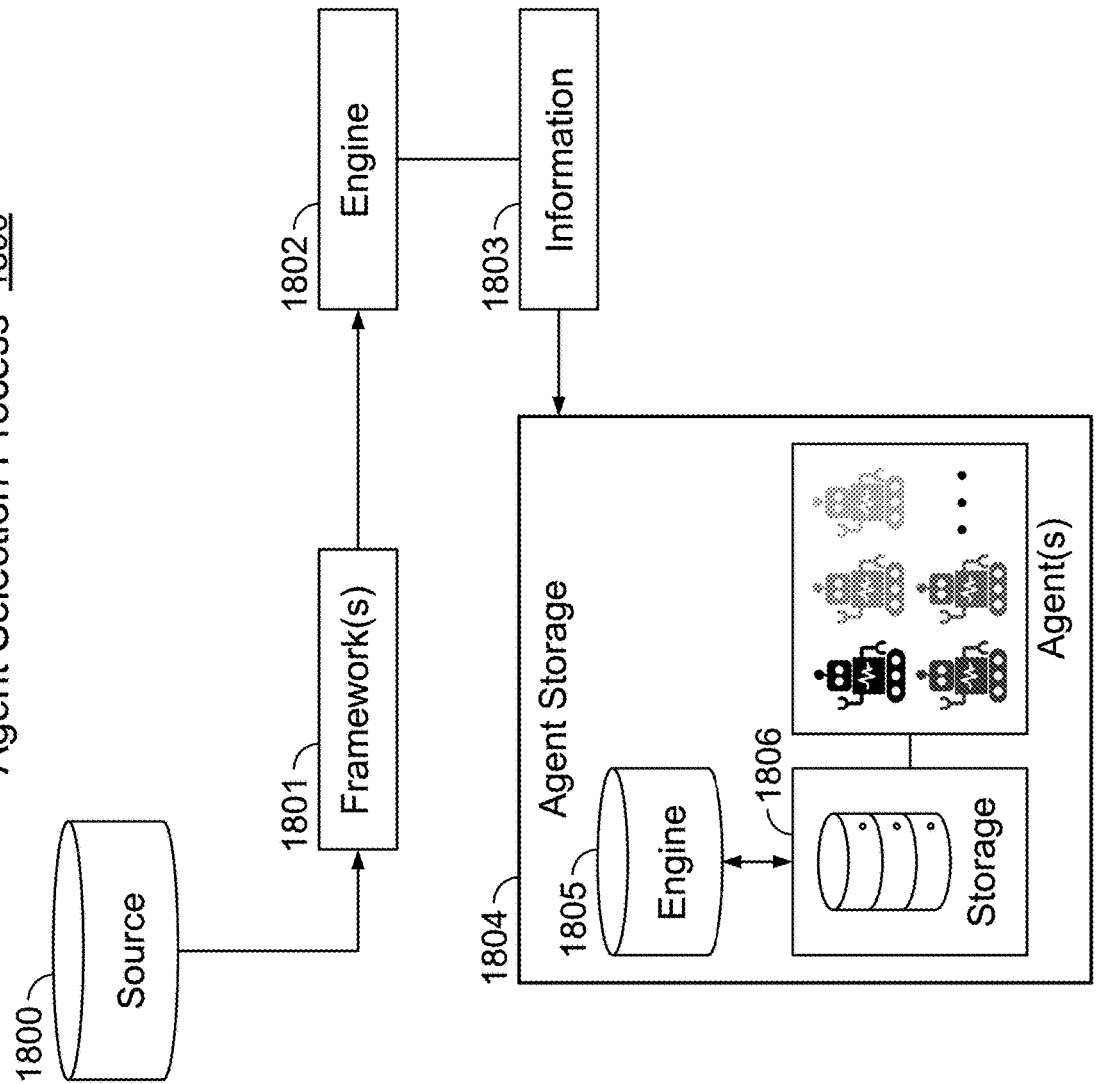
FIG. 18A is a diagram of an agent selection process.

FIG. 18A is a diagram of an agent selection process 1800, which selects one or more specialized agents to complete one or more tasks in the regulatory evaluation process. To begin the process, a source 1800 (such as a user, drive, or a storage system) shares one or more frameworks 1801 with an engine 1802. The frameworks 1801 may include internal company frameworks, custom frameworks, precedent, standards, etc. They may also include internal company regulations on a certain topic. For example, the frameworks may outline a company's current guidelines related to topics like privacy, governance, cybersecurity, patient safety, or quality control. Once received, the engine 1803 (e.g., a device, ruleset system, processor etc.) processes the frameworks 1801 and identifies information 1803 about them. The information may include the use-case or the query related to the frameworks, or it may identify a search topic related to the frameworks (e.g., privacy, governance, patient safety, quality control). In some embodiments, the engine 1802 uses one or more models to identify information 1803 about the frameworks. The one or more models may use textual extraction, text processing analysis, content type analysis, image analysis, video analysis, topic analysis, etc. to analyze the one or more framework(s) 1800. Once information 1803 is identified, the engine 1802 shares it with an agent storage system 1804. The agent storage system 1804 includes an engine 1805 and storage 1806, wherein the storage 1806 stores one or more specialized agents. Based on the information 1803 received, engine 1805 selects one or more specialized agents from the storage 1806. It should be understood that while engines 1803 and 1805 are depicted as different engines, they may be the same engine. The selected agents are then uploaded to engine 1802.

Figure 18B:
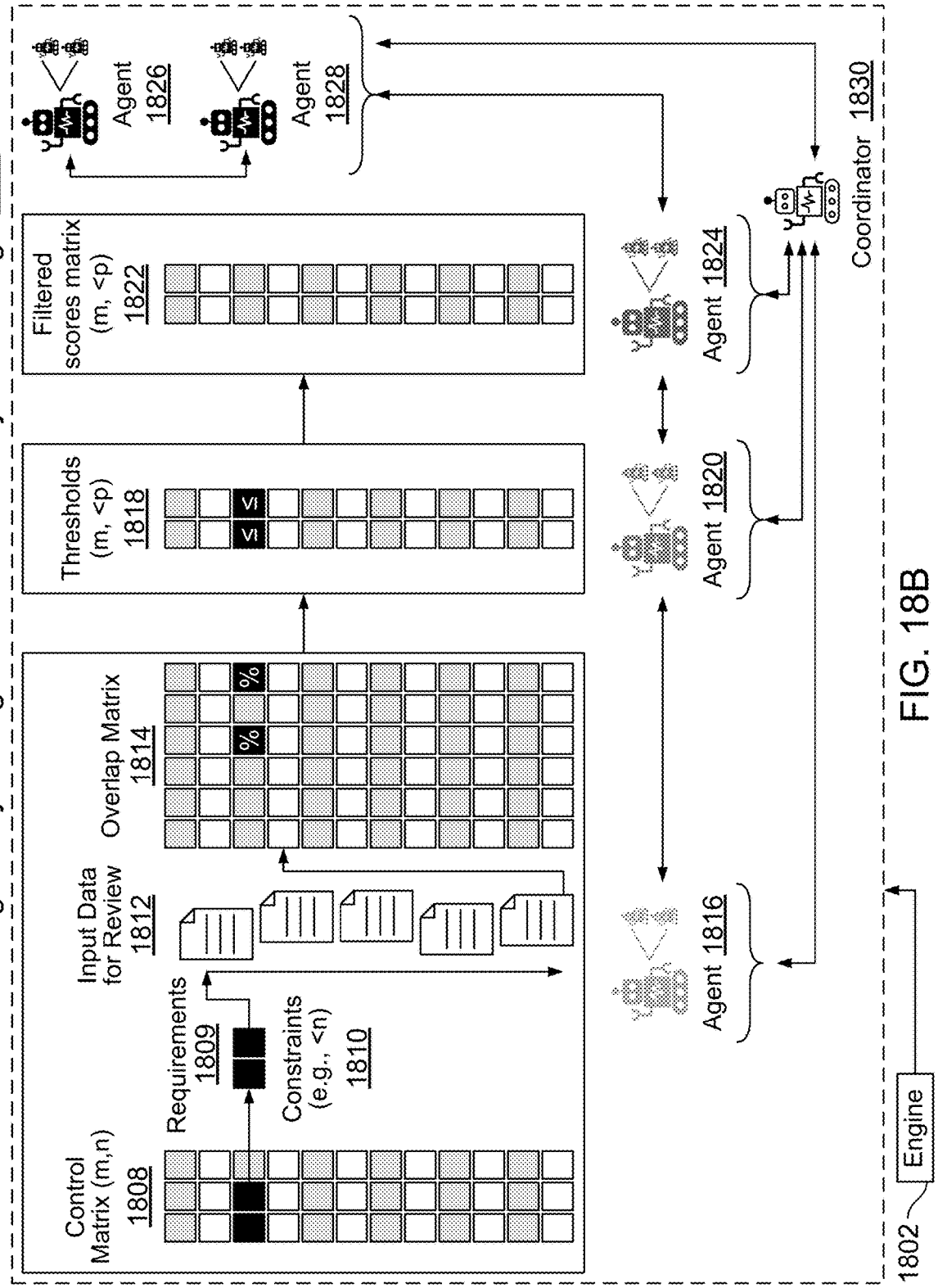
FIG. 18B is a diagram of a system for evaluating regulatory intelligence.

FIG. 18B is a diagram of an example regulatory intelligence evaluation system. Once one or more specialized agents are selected in the agent selection process 1800, they are deployed from engine 1802 to the regulatory intelligence evaluation system 1807. As depicted, the system 1807 employs a plurality of agents (1816, 1820, 1824, 1826, 1828, 1830) to complete specialized tasks in the regulatory intelligence evaluation. Agent 1816 is specialized to develop an overlap matrix 1814 from a control matrix 1908. As described above, the control matrix 1808 includes one or more requirements, wherein the requirements outline frameworks 1801 (internal company frameworks, custom frameworks, precedent, standards, etc.). In some embodiments, agent 1816 develops the overlap matrix 1814 alone. In other embodiments, agent 1814 develops the overlap matrix 1814 by coordinating one or more sub-agents. To build the overlap matrix 1814, agent 1816 thresholds extracted requirements 1809 from the control matrix 1808 with constraints 1810. Because agent 1816 is specialized for this task, it may be trained to identify which constraints 1810 to apply based on the use case of the search. Agent 1816 uses the constraints 1810 to identify a degree of overlap between requirements 1809 and the input data 1812 (e.g., existing public regulations, precedent, guidelines, standards, guidance). Agent 1816 may use an iterative process to analyze each requirement 1809 to build out the overlap matrix 1814.

After the overlap matrix is completed, another agent 1820 is specialized to apply thresholds 1818 to the overlap matrix. Similarly to agent 1816, agent 1820 may complete the thresholding tasks alone, or it may coordinate one or more sub-agents to help complete the task. Agent 1820 applies thresholds 1818 to the overlap matrix 1814. Because agent 1820 is specialized, it may be trained to identify which thresholds to apply to the overlap matrix 1814 based on the use case of the regulations. Alternatively, Agent 1820 may use a predefined threshold set by an expert or some other source. Next, Agent 1824 builds out the filtered scores matrix 1822. Agent 1824 may complete this task alone, or it may coordinate one or more sub-agents to complete the task. Then, one or more agents, such as agents 1826 and 1828 review the overlap and thresholding results within the loop.

In some embodiments, only agents 1826 and 1828 do this review. In other embodiments, agents 1826 and 1828 coordinate one or more sub-agents complete the review. In some embodiments, agents 1826 and 1828 flag high, low, or medium significance alerts based on one or more results in the filtered scores matrix 1822.

After the review, a coordinating agent 1830 further reviews and revises the results from agents 1816, 1820, 1824, 1826, and 1828. The coordinating agent 1830 may be specialized across multiple use cases, so it can more accurately coordinate the sub-agents (1816, 1820, 1824, 1826, and 1828). In some embodiments, the coordinating agent 1830 may compile the results from the system evaluation. The coordinating agent 1830 may summarize and organize the results, and it may prepare them for display on a user interface. In some embodiments, the coordinator 1830 prepares "high effort," "medium effort," and "low effort" recommendations for system users to comply with the emerging regulations. Once system 1807 outputs its analysis, a user can provide feedback on the system's recommendations. This feedback can be used to re-train the one or more agents operating within system 1800. In a future evaluation, the system 1807 can detect that a received query matches to a query that was already processed by the system 1807, and can take preventative actions, such as implementing the feedback from the previous search, and returning, to the client device, the improved evaluation based on their preferences. Finally, it should be understood that, while agents 1816, 1820, 1824, 1826, 1826, and 1830 are described as different agents, fewer or more agents may be used to complete the regulatory intelligence evaluation.

Figure 19:
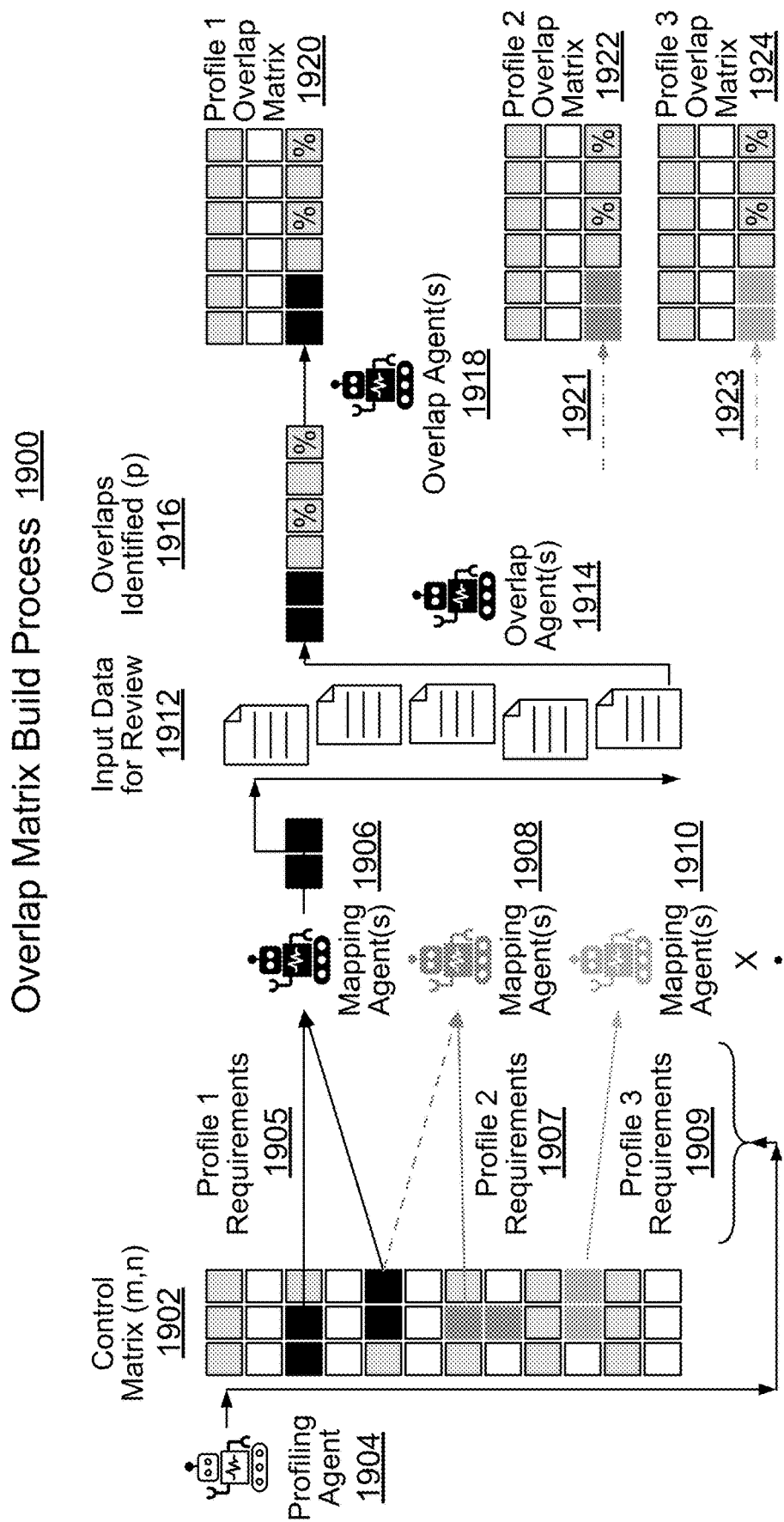
FIG. 19 is a flow diagram of a process for building an overlap matrix.

FIG. 19 is a diagram of an example system for building one or more overlap matrices (e.g., system 1900). The system begins with a control matrix 1902. A profiling agent 1904 (sometimes referred to as a profile-specific agent) is specialized to match "profiles" (e.g., privacy, governance, cybersecurity, health/medical, epidemiology, RWE, legal, regulatory, generalist, etc.) to requirements. The profiling agent 1904 sorts requirements 1905, 1907, 1909 in the control matrix 1902 into different profiles (e.g., Profile 1, Profile 2, Profile 3), and it directs these sorted profile requirements 1905, 1907, 1909 to a mapping agent (1906, 1908, 1910). As shown, the profiling agent 1904 sorts requirements to multiple profiles at a time. In an example scenario, profile 1 (1905) relates to privacy, profile 2 (1908) relates to governance, and profile 3 (1909) relates to cybersecurity. In some embodiments, the profiling agent 1904 tags requirements in the overlap matrix 1902 based on profile, and the mapping agent(s) (1906, 1908, 1910) extract the tagged requirements for their review of the input data 1912. The mapping agents 1906, 1908, 1910 map the requirements to the input data 1912, after which a first overlap agent 1914 identifies overlaps 1916 between the requirements and the input data 1912. A second overlap agent 1918 then builds out the overlap matrix 1920 for profile 1. The other mapping agents 1908 and 1910 (and other overlap agents) will complete the same process in parallel to develop the overlap matrix for profile 2 (1922) and profile 3 (1924). This parallelized process is denoted with arrows 1921 and 1923. It should be understood that the overlap matrix build process may employ more or fewer agents than depicted. Furthermore, each agent depicted may coordinate one or more sub-agents to help complete profiling, mapping, overlap, and coordination tasks. In some embodiments, the agents depicted engage in "cross-talk" or validation, where they may review or validate one another's outputs.

Figure 20:
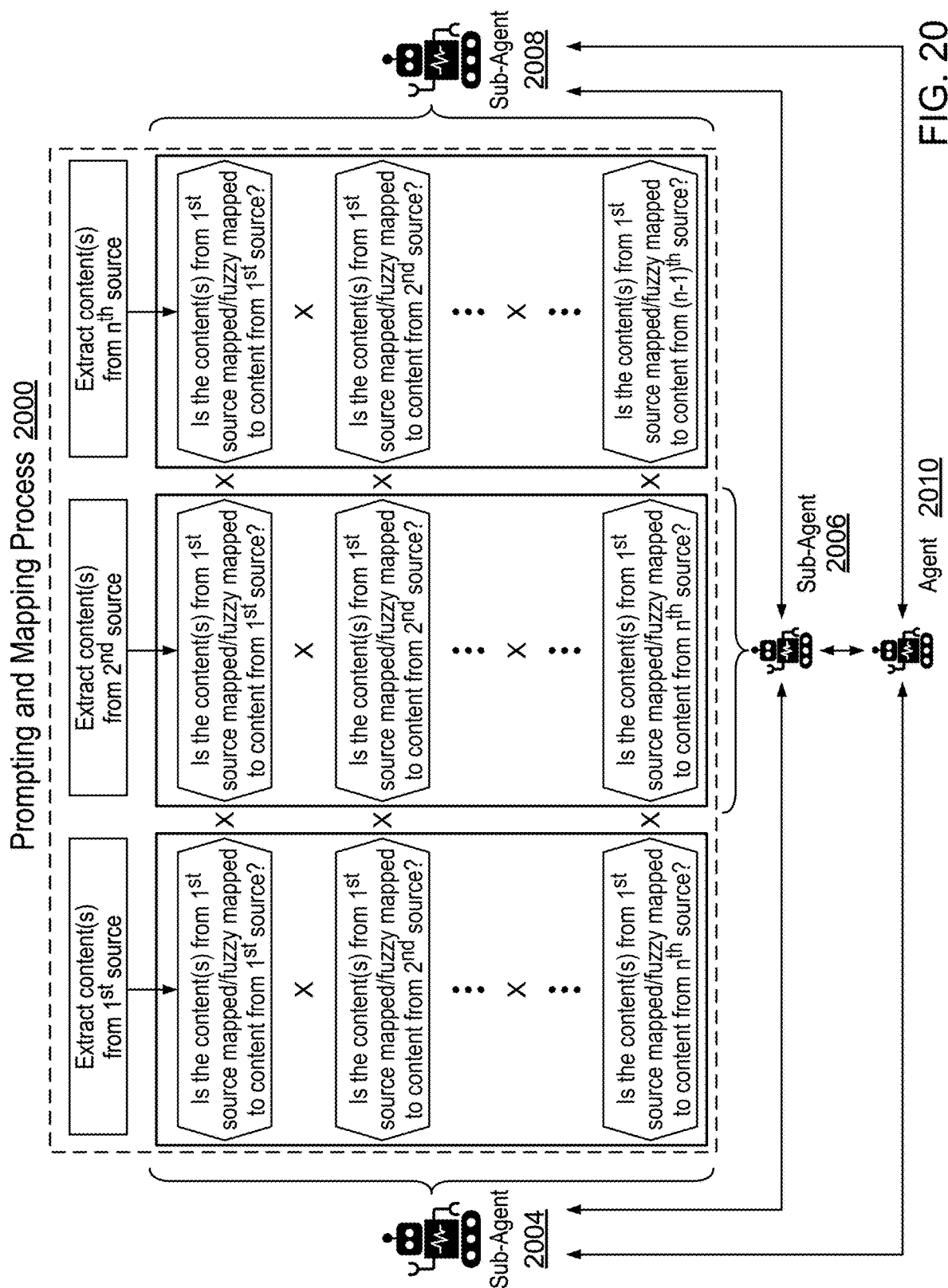
FIG. 20 is a diagram of a prompting and mapping process.

FIG. 20 is a diagram of an example prompting and mapping process (e.g., implemented by system 2000). The prompting and mapping may occur one or more times within the regulatory intelligence evaluation system 100. The system 2000 may employ one or more agents, wherein the agents may be specialized in different types or content analysis. For example, some agents may be specialized for content analysis in privacy, while others may specialize in governance, or cybersecurity regulation analysis. Some agents may be specialized to coordinate sub-agents. As described above, one or more agents may be grouped in a sub-agent pool. In some embodiments, the sub-agent pool has one or more profiles for different queries—for example, it may have a profile of agents for privacy-related sources, or a profile for cybersecurity queries. An engine may deploy groups of agents for specific tasks. For the prompting and mapping process, an engine may deploy a coordinating agent 2010, and three sub-agents 2004, 2006, 2008. In some embodiments, the agent 2010 is specialized to identify the use case from the one or more sources (e.g., privacy, governance, cybersecurity), and it may select and deploy the one or more sub-agents (2004) (2006) (2008) from the sub-agent pool. The sub-agents 2004, 2006, 2008 may be specialized to complete the prompting and mapping process, and they may be further specialized to conduct prompting and mapping for specific queries. In an example scenario, all the agents depicted (2004, 2006, 2008, 2010) are specialized to conduct prompting and mapping for privacy-related queries. Once deployed, the sub-agents 2004, 2006, and 2008 extract key regulatory information from one or more sources identified during the collection and aggregation process 300. Sub-agents 2004, 2006, and 2008 are specialized to extract key content(s) from each source, wherein the content(s) may relate to specific public guidance, regulations, or frameworks for a use case. Sub-agents 2004, 2006, and 2008 compare all the extracted contents within and across each source. They may complete this analysis with source mapping or a fuzzy content search.

To compare source content, the sub-agents 2004, 2006, and 2008 may instruct one or more models or sub-agents (e.g., LLMs, NLP, AI models, etc.) to compare the identified content(s) from a first source (e.g. identified keywords, concepts, and phrases, key regulatory information) to the identified content(s) of a second source. The prompting and mapping process 2000 may compare source content directly or indirectly. In a direct comparison, sub-agents 2004, 2006, and 2008 determine if the exact concepts or content identified within a first source are also identified within a second source. In an indirect comparison, or with a "fuzzy search" comparison, the sub-agents 2004, 2006, and 2008 search for words or phrases of the content in a second source matching the meaning of the identified content in a first source. The words or phrases from the fuzzy search in the second source do not necessarily share the same wording as the identified keywords, phrases, or concepts from the first source. Once the content(s) from the one or more sources are compared to the content(s) of the other sources, the sub-agents 2004, 2006, and 2008 determine whether the content from all sources mapped to each other. For example, the sub-agents 2004, 2006, and 2008 may identify whether all the sources mention a specific regulation, or they may determine whether all the source content is consistent around a specific regulation. The sub-agents 2004, 2006, and 2008 may determine an overlap score for each content comparison between a first source and a second source, wherein the score is indicative of a "mapping" or overlap between contents of the sources. The sub-agents 2004, 2006, and 2008 may provide an overlap score for each extracted key regulatory topic identified across the sources, they may provide an overall overlap score to identify how closely all the sources relate to one another, and whether the content is consistent across the sources. In some embodiments, the sub-agents 2004, 2006, and 2008 engage in "cross-talk", wherein they may validate each other's outputs.

While three sources are depicted in the prompting and mapping system 2000, it should be understood that the prompting and mapping process may compare more or fewer sources to one another. Also, while three sub-agents 2004, 2006, and 2008, and one coordinating agent 2010 are depicted, they may each employ one or more sub-agents to complete their content mapping and coordinating tasks.

After comparing the content among the sources, the sub-agents 2004, 2006, and 2008 may determine if the content(s) from all the sources are sufficiently mapped to one another. The sub-agents 2004, 2006, and 2008 may use the thresholding score to make this determination. If the source content(s) are not sufficiently mapped to one another, the sub-agents 2004, 2006, and 2008 may prompt a reviewer (e.g. Agent 2010, one or more models, one or more individuals, an expert, an analyst etc.) for an action. The reviewer may be prompted to select another source, update prompts and queries in the prompting and mapping process 2000, among other actions. If the sub-agents 2004, 2006, and 2008 determine that the contents are sufficiently mapped to one another, they may compile a framework, which may be a quality, regulatory, or compliance matrix. The framework may be two dimensional, and it may organize, map, and compile each piece of regulatory intelligence into the matrix. In some implementations, each row of the matrix may summarize a different law, guidance, or regulation. While the sub-agents 2004, 2006, and 2008 may compare the sources from a single search to each other, it should also be understood that they may compare sources from one search to sources of another search. Furthermore, while one sub-agent is depicted per source, it should be understood that more or fewer sub-agents may be used to extract content from the one or more sources.

Figure 21:
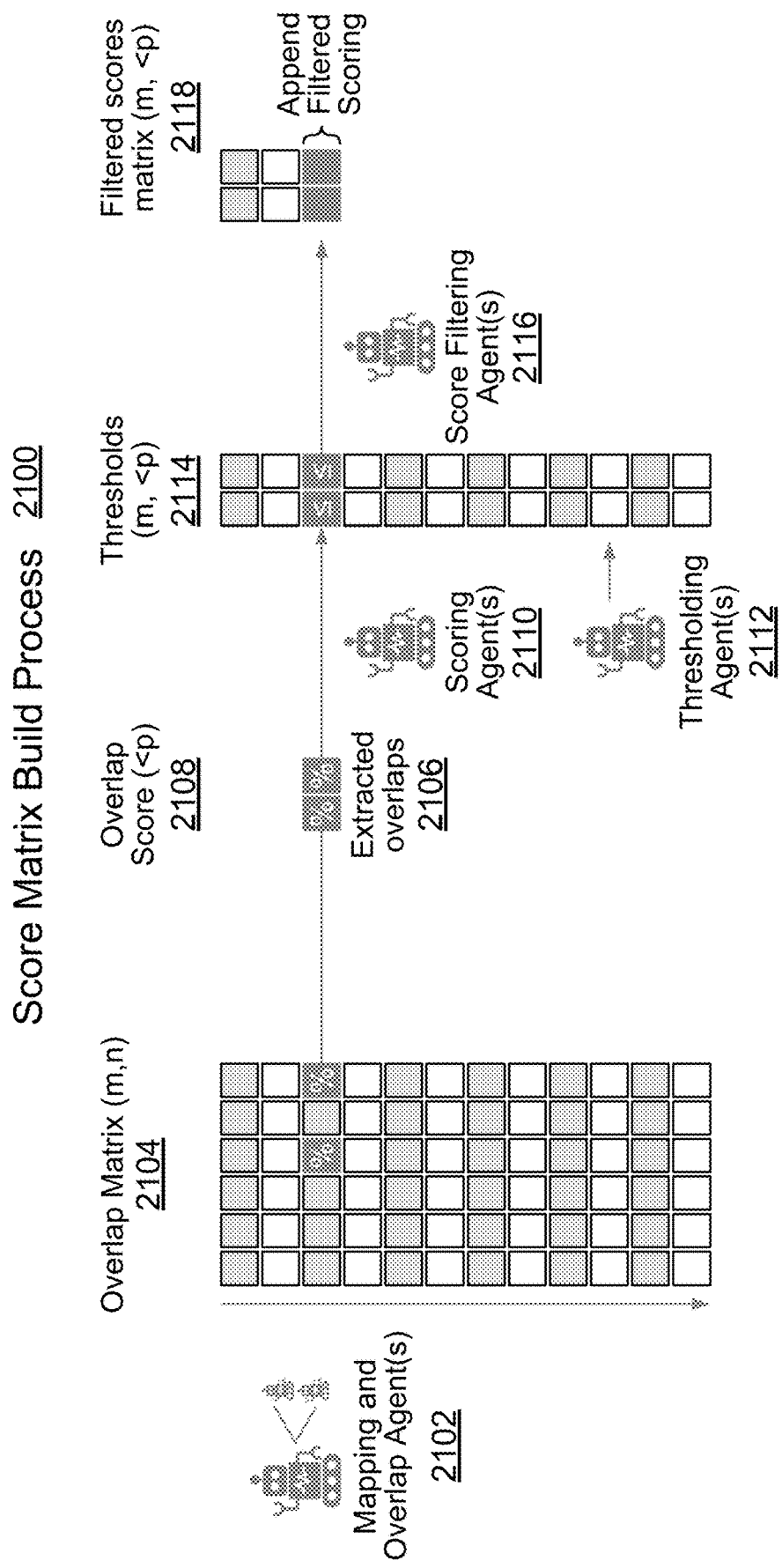
FIG. 21 is a flow diagram of a process for building a score matrix.

FIG. 21 is a diagram of an example score matrix build process (e.g., implemented by a system 2100). The score matrix build process may occur one or more times within the regulatory intelligence evaluation system 100. The system 2100 uses a two dimensional (m,p) overlap matrix 2104 (which was an output from the overlap matrix build process 1900) as an input, and it outputs the filtered scores matrix 2118. The overlap matrix (m,p) 2104 may include information about one or more regulations and their overlap score with a set of input documents identified during a collection and aggregation process 300. As described above, an agent or engine may select and deploy one or more agents to complete the score matrix build process 2100. The deployed agents (depicted as agents 2102, 2110, 2112, 2116, 2118) may be specialized to conduct the overall score matrix build process, or they may be sub-specialized to complete parts of the score matrix build process. Also, the deployed agents 2102, 2110, 2112, 2116, 2118 may be specialized to build a score matrix for a specific query topic (e.g., cybersecurity). As depicted in FIG. 21, agents are sub-specialized for different parts of the score matrix build process. A mapping overlap agent 2102 is specialized to map, identify, and extract overlaps in an overlap matrix 2104. Next, a scoring agent 2110 is specialized to assign an overlap score 2108 to the extracted overlaps 2106. Then, a thresholding agent 2112 is specialized to threshold the requirements based on a pre-defined or identified threshold for the query. A system administrator (e.g., a coordinating agent) may provide one or more overlap score evaluation constraints to evaluate specific rows or columns from the overlap matrix (m,n) 2104. For example, the system administrator may instruct the regulatory intelligence evaluation system 2100 to extract only information about the extracted overlap scores and the corresponding regulation. Additionally, a system administrator may specify a threshold constraint, wherein each extracted overlap 2106 must meet a threshold constraint. Thresholds may include ranges, or they may come from guardrails, in which case the scoring is weighted and adjusted accordingly. Guardrails may be set by experts on the regulatory topic, or they may be set by one or more models or agents specialized to threshold the degree of overlap. After the thresholding agent(s) 2112 finalize the thresholds 2114, a score filtering agent 2116 loops through the thresholds matrix 2114, and it appends the filtered scores to a filtered scores matrix 2118.

Based on the one or more overlap score evaluation constrains, the agents extract overlaps 2106 by row and compare the overlap score information in the row to the specified threshold. The thresholding agents 2112 identify whether the overlap score information from the extracted overlaps 2106 meets the threshold. Alternatively, the system may employ a range-based thresholding system, wherein each extracted overlap 2106 is assigned to a threshold range. For example, a high threshold range may correspond to an overlap score of 66-100%. A medium threshold range may correspond to overlap scores of 33-66%. A low threshold range may correspond to overlap scores of 0-33%. The score filtering agent 2116 appends information to the extracted overlaps 2106 to identify which threshold the overlap is associated with (e.g., high, medium, or low overlap). The score filtering agent 2116 may repeat this process and iterate through each extracted overlap to build out the filtered scores matrix 2118. While an iterative process is described, score filtering agent 2116 may interpret the score, overlap and thresholds in a single step using vector-based operations (eliminating the iterative process shown). In some embodiments, the importance of each document can also be weighed, to adjust the score by importance. For example, legal documents may be weighed higher (e.g., a weight of 1) while other documents may be weighted lower. Regulatory guidance documents may be weighted 0.75, industry standards may be weighted 0.5, etc. In this example, legal and regulatory documents are the most important factor. In some embodiments, other documents may have a higher weight, depending on the sector, project goals, and industry of the user. In some embodiments, weighting is selected by an expert, one or more models, or another agent. While numerous agents (2102, 2110, 2112, and 2116) are depicted to be specialized for specific tasks within the score matrix build process, it should be understood that one or more of these agents may be specialized to complete the overall score matrix build process, or other parts of the process. The agents 2102, 2110, 2112, and 2116 may also be cross-specialized for each-other's tasks, and they may engage in "cross-talk" or cross-verification to verify each other's results. Also, while four agents are depicted, it should be understood that more or fewer agents can complete the score matrix build process 2100.

Figure 22:
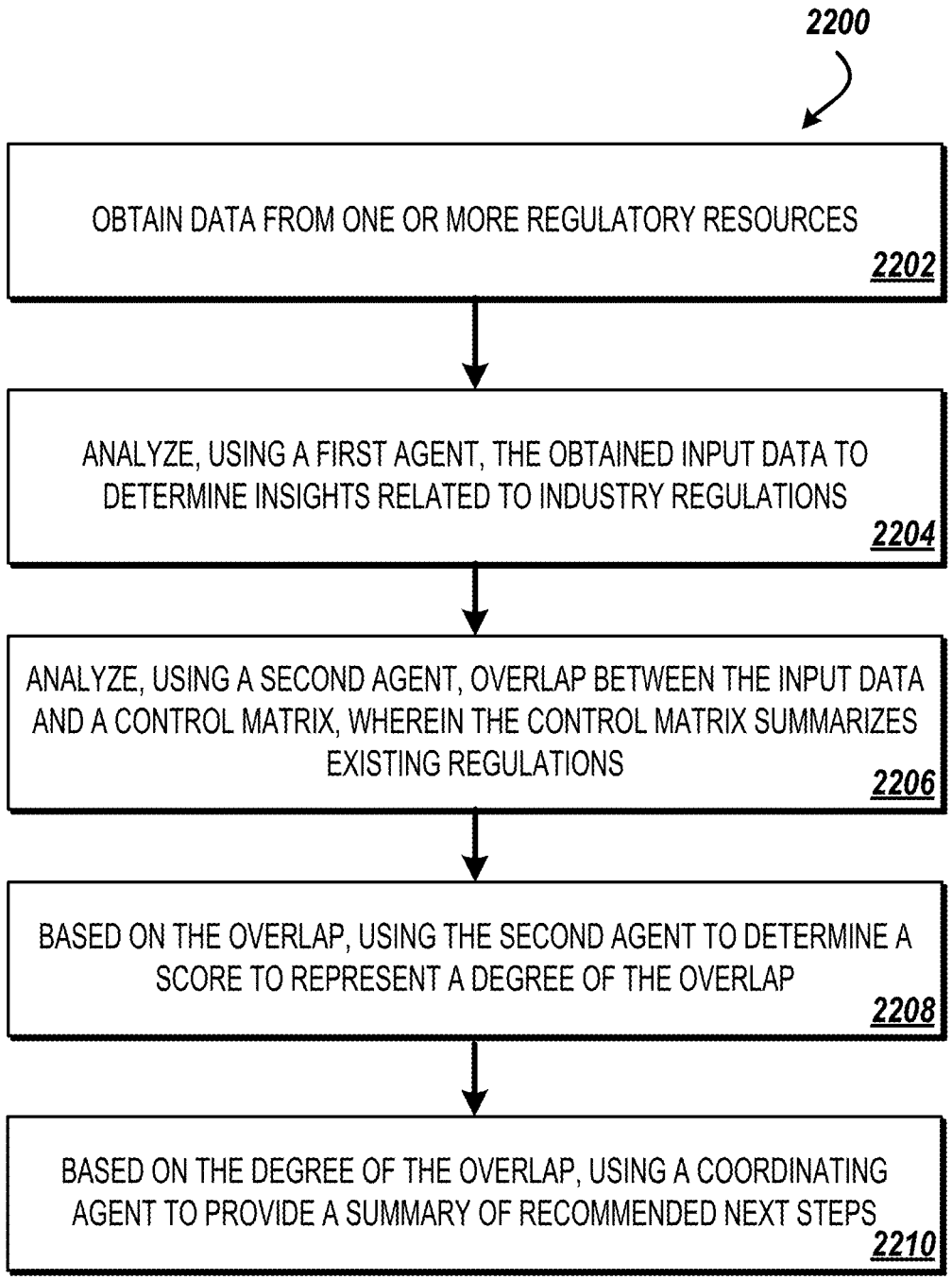
FIG. 22 is a flow diagram of an example process for detecting and evaluating an interaction.

FIG. 22 is a flow diagram of an example process for detecting and evaluating an interaction. For convenience, the process 2200 will be described as being performed by a system of one or more computers located in one or more locations. For example, a regulatory intelligence evaluation system, e.g., the regulatory intelligence evaluation system 100 of FIG. 1, appropriately programmed in accordance with this specification, can perform the process 900. As shown, the process 2200 may first obtain data from one or more regulatory resources. The system analyzes, using a first agent, the obtained input data to determine insights related to industry regulations. The system further analyzes, using a second agent, overlap between the input data and a control matrix, wherein the control matrix summarizes existing regulations. Based on the overlap, the system determines uses the second agent to determine a score to represent a degree of the overlap. Finally, based on the degree of the overlap, the system uses a coordinating agent to provide a summary of recommended next steps.

Elements of different embodiments described herein may be combined to form other embodiments not specifically set forth above. Elements may be left out of the processes, computer programs, Web pages, etc. described herein without adversely affecting their operation. Furthermore, various separate elements may be combined into one or more individual elements to perform the functions described herein.

Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
    obtaining input data from one or more regulatory resources;
    analyzing, using a first set of models, the obtained input data to determine insights related to industry regulations, wherein a first agent analyzes the obtained input data to determine insights related to industry regulations;
    analyzing, using a second set of models, overlap between the input data and a control matrix, wherein the control matrix summarizes existing regulations;
    based on the overlap, determining a score to represent a degree of the overlap; and
    based on the degree of the overlap, providing a summary of recommended next steps.

2. The method of claim 1, wherein the one or more regulatory resources comprises one or more of regulatory bodies, industry reports, news articles, and guidance documents.

3. The method of claim 1, wherein the first set of models comprises one or more large language models or natural language processing models.

4. The method of claim 1, wherein the second set of models comprises one or more large language models or natural language processing models.

5. The method of claim 1, wherein the control matrix comprises a two-dimensional matrix structure, wherein each row represents a predefined regulation.

6. The method of claim 5, wherein the analyzing comprises using a two-dimensional overlap matrix, wherein the overlap matrix identifies the overlap between each regulation in the control matrix and the input data.

7. The method of claim 6, wherein the analyzing comprises using a predefined threshold to identify a high, medium, or low degree of overlap between each regulation and the input data.

8. The method of claim 7, wherein the summary includes one or more alerts, representative of a high, medium, or low significance alert based on the degree of the overlap.

9. The method of claim 1, wherein a second agent analyzes the overlap between the input data and a control matrix.

10. The method of claim 9, wherein the second agent determines a score to represent a degree of the overlap.

11. The method of claim 10, wherein the first and second agents engage in cross-validation.

12. The method of claim 11, wherein a coordinating agent provides a summary of recommended next steps.

13. The method of claim 12, wherein the coordinating agent reviews results of the first and second agents.

14. The method of claim 12, wherein the coordinating agent prepares "high effort," "medium effort," and "low effort" recommendations based on the degree of overlap.

15. A non-transitory computer readable storage medium storing instructions that, when executed by one or more processors, cause the one or more processors to perform operations comprising:
    obtaining input data from one or more regulatory resources;
    analyzing, using a first set of models, the obtained input data to determine insights related to industry regulations, wherein a first agent analyzes the obtained input data to determine insights related to industry regulations;
    analyzing, using a second set of models, overlap between the input data and a control matrix, wherein the control matrix summarizes existing regulations;
    based on the overlap, determining a score to represent a degree of the overlap; and
    based on the degree of the overlap, providing a summary of recommended next steps.

16. A system comprising one or more processors coupled to a memory, the one or more processors and memory configured to perform operations comprising:
    obtaining input data from one or more regulatory resources;
    analyzing, using a first set of models, the obtained input data to determine insights related to industry regulations, wherein a first agent analyzes the obtained input data to determine insights related to industry regulations;
    analyzing, using a second set of models, overlap between the input data and a control matrix, wherein the control matrix summarizes existing regulations;
    based on the overlap, determining a score to represent a degree of the overlap; and
    based on the degree of the overlap, providing a summary of recommended next steps.

17. A computing system comprising one or more processors coupled to a memory, the processors and the memory configured to:
    obtain input data from one or more regulatory resources;
    analyze, using a first set of models, the obtained input data to determine insights related to industry regulations, wherein a first agent analyzes the obtained input data to determine insights related to industry regulations;
    analyze, using a second set of models, overlap between the input data and a control matrix, wherein the control matrix summarizes existing regulations;
    based on the overlap, determine a score to represent a degree of the overlap; and based on the degree of the overlap, provide a summary of recommended next steps.

* * * * *